(12) United States Patent
Du et al.

(10) Patent No.: US 11,024,037 B2
(45) Date of Patent: Jun. 1, 2021

(54) FOREGROUND-BACKGROUND-AWARE ATROUS MULTISCALE NETWORK FOR DISPARITY ESTIMATION

(71) Applicant: Samsung Electronics Co., Ltd., Suwon-si (KR)

(72) Inventors: Xianzhi Du, San Jose, CA (US); Mostafa El-Khamy, San Diego, CA (US); Jungwon Lee, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 16/451,524

(22) Filed: Jun. 25, 2019

(65) Prior Publication Data

US 2020/0160533 A1 May 21, 2020

Related U.S. Application Data

(60) Provisional application No. 62/768,055, filed on Nov. 15, 2018.

(51) Int. Cl.
*G06T 7/194* (2017.01)
*G06T 7/593* (2017.01)
(Continued)

(52) U.S. Cl.
CPC ............ *G06T 7/194* (2017.01); *G06K 9/4604* (2013.01); *G06N 3/08* (2013.01); *G06T 7/596* (2017.01)

(58) Field of Classification Search
CPC . G06T 7/194; G06T 7/596; G06T 7/11; G06T 7/593; G06T 2207/20084;
(Continued)

(56) References Cited

U.S. PATENT DOCUMENTS

| 5,960,111 A * | 9/1999 | Chen ........................ G06K 9/34 |
| | | 348/14.08 |
| 2014/0035909 A1 | 2/2014 | Abramoff et al. |

(Continued)

FOREIGN PATENT DOCUMENTS

| WO | 2013109252 A1 | 7/2013 |
| WO | 2018211127 A1 | 11/2018 |

OTHER PUBLICATIONS

A. Adams, J. Baek, and M. Davis. Fast high-dimensional filtering using the permutoheral lattice. In Eurographics, 2010.
(Continued)

*Primary Examiner* — Juan A Torres
(74) *Attorney, Agent, or Firm* — Lewis Roca Rothgerber Christie LLP

(57) ABSTRACT

A system for disparity estimation includes one or more feature extractor modules configured to extract one or more feature maps from one or more input images; and one or more semantic information modules connected at one or more outputs of the one or more feature extractor modules, wherein the one or more semantic information modules are configured to generate one or more foreground semantic information to be provided to the one or more feature extractor modules for disparity estimation at a next training epoch.

20 Claims, 9 Drawing Sheets
(2 of 9 Drawing Sheet(s) Filed in Color)

(51) Int. Cl.
*G06N 3/08* (2006.01)
*G06K 9/46* (2006.01)

(58) Field of Classification Search
CPC ........ G06N 3/08; G06N 3/082; G06N 3/0454;
G06N 3/084; G06K 9/4604; G06K
9/4628; G06K 9/6262
USPC ......................................................... 382/154
See application file for complete search history.

(56) References Cited

U.S. PATENT DOCUMENTS

| | | | |
|---|---|---|---|
| 2014/0307047 | A1 | 10/2014 | Kirk et al. |
| 2016/0026253 | A1 | 1/2016 | Bradski et al. |
| 2018/0020205 | A1 | 1/2018 | Aflalo et al. |
| 2018/0253622 | A1 | 9/2018 | Chen et al. |
| 2018/0285692 | A1* | 10/2018 | Xiao ................... G06K 9/4604 |

OTHER PUBLICATIONS

J.-R. Chang and Y.-S. Chen. Pyramid stereo matching network. In Proceedings of the IEEE Conference on Computer Vision and Pattern Recognition, pp. 5410-5418, 2018.
L. Chen, Y. Yang, J. Wang, W. Xu, and A. Yuille. Attention to scale: Scaleaware semantic image segmentation. In CVPR, 2016.
L.-C. Chen, G. Papandreou, I. Kokkinos, K. Murphy, and A. L. Yuille. Deeplab: Semantic image segmentation with deep convolutional nets, atrous convolution, and fully connected crfs. arXiv:1606.00915, 2016.
L.-C. Chen, Y. Yang, J. Wang, W. Xu, and A. L. Yuille. Attention to scale: Scale-aware semantic image segmentation. In CVPR, arXiv:1511.03339v2, 2016.
L.-C. Chen, Y. Zhu, G. Papandreou, F. Schroff, and H. Adam. Encoder-decoder with atrous separable convolution for semantic image segmentation. In ECCV, 2018.
F. Chollet. Xception: Deep learning with depthwise separable convolutions. In Proceedings of the IEEE Conference on Computer Vision and Pattern Recognition, pp. 1800-1807, 2017.
J. Dai, H. Qi, Y. Li, G. Zhang, H. Hu, and Y. Wei. Deformable convolutional networks—coco detection and segmentation challenge 2017 entry. In ICCV COCO Challenge Workshop, 2017.
A. Dosovitskiy, P. Fischer, E. Ilg, P. Husser, C. Haz, V. Golkov, P. v.d. Smagt, D. Cremers, and T. Brox. Flownet: Learning optical flow with convolutional networks. In IEEE International Conference on Computer Vision (ICCV), Dec. 2015.
D. Eigenand and R.Fergus. Predicting depth, surface normals and semantic labels with a common multi-scale convolutional architecture. In ICCV, 2015.
C. Farabet, C. Couprie, L. Najman, and Y. LeCun. Learning hierarchical features for scene labeling. IEEE Transactions on Pattern Analysis and Machine Intelligence, 35(8):1915-1929, Aug. 2013.
A. Geiger, P. Lenz, and R. Urtasun. Are we ready for autonomous driving? the kitti vision benchmark suite. In Conference on Computer Vision and Pattern Recognition (CVPR), 2012.
K. He, X. Zhang, S. Ren, and J. Sun. Spatial pyramid pooling in deep convolutional networks for visual recognition. In D. Fleet, T. Pajdla, B. Schiele, and T. Tuytelaars, editors, Computer Vision—ECCV 2014, pp. 346-361, Cham, 2014. Springer International Publishing.
K. He, X. Zhang, S. Ren, and J. Sun. Deep residual learning for image recognition. arXiv preprint arXiv:1512.03385, 2015.
A. Kendall, H. Martirosyan, S. Dasgupta, P. Henry, R. Kennedy, A. Bachrach, and A. Bry. End-to-end learning of geometry and context for deep stereo regression. CoRR, abs/1703.04309, 2017.
P. Krahenbuhl and V. Koltun. Efficient inference in fully connected crfs with gaussian edge potentials. In NIPS, 2011.
G. Lin, C. Shen, and van den Hengel. Efficient piecewise training of deep structured models for semantic segmentation. In CVPR, 2016.
W. Luo, A. G. Schwing, and R. Urtasun. Efficient deep learning for stereo matching. In 2016 IEEE Conference on Computer Vision and Pattern Recognition (CVPR), pp. 5695-5703, Jun. 2016.
N. Mayer, E. Ilg, P. H¨ausser, P. Fischer, D. Cremers, A. Dosovitskiy, and T. Brox. A large dataset to train convolutional networks for disparity, optical flow, and scene flow estimation. In IEEE International Conference on Computer Vision and Pattern Recognition (CVPR), 2016. arXiv:1512.02134.
M. Menze and A. Geiger. Object scene flow for autonomous vehicles. In Conference on Computer Vision and Pattern Recognition (CVPR), 2015.
A. Newell, K. Yang, and J. Deng. Stacked hourglass networks for human pose estimation. In ECCV, pp. 483-499, 2016.
P. Pinheiro and R. Collobert. Recurrent convolutional neural networks for scene labeling. In ICML, 2014.
M. Sandler, A. Howard, M. Zhu, A. Zhmoginov, and L.-C Chen. Mobilenetv2: Inverted residuals and linear bottlenecks. In CVPR, 2018.
K. Simonyan and A. Zisserman. Very deep convolutional networks for large-scale image recognition. CORR, abs/1409.1556, 2014.
X. Song, X. Zhao, H. Hu, and L. Fang. Edgestereo: A context integrated residual pyramid network for stereo matching. In ACCV, 2018.
S. Tulyakov, A. Ivanov, and F. Fleuret. Practical deep stereo (pds): Toward applications-friendly deep stereo matching. NIPS, 2018.
G. Yang, H. Zhao, J. Shi, Z. Deng, and J. Jia. SegStereo: Exploiting semantic information for disparity estiniation. In ECCV, 2018.
F. Yu and V. Koltun. Multi-scale context aggregation by dilated convolutions. In ICLR, 2016.
J. Zbontar and Y. LeCun. Stereo matching by training a convolutional neural network to compare image patches. Journal of Machine Learning Research, 17:1-32, 2016.
H. Zhao, J. Shi, X. Qi, X. Wang, and J. Jia. Pyramid scene parsing network. In Proceedings of IEEE Conference on Computer Vision and Pattern Recognition (CVPR), 2017.
Nikolaus Mayer, et al., "A Large Dataset to Train Convolutional Networks for Disparity, Optical Flow, and Scene Flow Estimation", Computer Vision Foundation and IEEE Xplore, pp. 4040-4048.
Akihito Seki, et al., "Patch Based Confidence Prediction for Dense Disparity Map", Proceedings of the British Machine Vision Conference (BMVC), pp. 23.1-23.13, BMVA Press, Sep. 2016, https://dx.doi.org/10.5244/C.30.23.
Noha Radwan, et al., "VLocNett++: Deep Multitask Learning for Semantic Visual Localization and Odometry", 2 arXiv preprint arXiv:1804.08366 v1, 14 pgs, Apr. 23, 2018.

\* cited by examiner

FOREGROUND-BACKGROUND-AWARE ATROUS MULTISCALE NETWORK FOR DISPARITY ESTIMATION

CROSS-REFERENCE TO RELATED APPLICATION(S)

The present application claims priority to and the benefit of U.S. Provisional Patent Application Ser. No. 62/768,055, filed Nov. 15, 2018 and entitled "FOREGROUND-BACKGROUND-AWARE ATROUS MULTISCALE NETWORK FOR DISPARITY ESTIMATION," the entire content of which is hereby expressly incorporated by reference.

FIELD

One or more aspects of embodiments according to the present disclosure relate to a foreground-background-aware atrous multiscale network (FBA-AMNet) for disparity estimation.

BACKGROUND

Depth estimation is a fundamental computer vision problem aiming to predict a measure of distance of each point in a captured scene. This has many applications such as the capability of separating the foreground (close) objects from the background (far) objects. Accurate depth estimation allows separation of the foreground objects of interest from the background in a scene and allows processing images from non-professional photographers or cameras with smaller lenses to obtain more aesthetically pleasant images which focus on the subject.

The above information in the Background section is only for enhancement of understanding of the background of the technology and therefore it should not be construed as admission of existence or relevancy of the prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Aspects of example embodiments of the present disclosure relate to a foreground-background-aware atrous multiscale network for disparity estimation.

According to some example embodiments of the present disclosure, a system for disparity estimation includes one or more feature extractor modules configured to extract one or more feature maps from one or more input images; and one or more semantic information modules connected at one or more outputs of the one or more feature extractor modules, wherein the one or more semantic information modules are configured to generate one or more foreground semantic information to be provided to the one or more feature extractor modules for disparity estimation at a next training epoch.

In some embodiments, the system further includes an extended cost volume (ECV) module connected at the one or more outputs of the one or more feature extractor modules, the ECV module configured to compute matching cost information between the one or more features maps; a stacked atrous multiscale (AM) module connected at an output of the ECV module and configured to process the matching cost information between the one or more feature maps from the ECV module to aggregate multiscale context information, the stacked AM module includes a plurality of AM modules stacked together; and a regression module connected at an output of the stacked AM module and configured to estimate a disparity of the system based on the aggregated multiscale context information from the stacked AM module and one or more foreground semantic information.

In some embodiments, the ECV module includes a disparity-level feature distance sub-volume module configured to determine a pixel wise absolute difference between the first feature map and the second feature map; a disparity level depthwise correlation sub-volume module configured to determine a correlation between the first feature map and the second feature map; and a disparity-level feature concatenation sub-volume module configured to concatenate, at each disparity-level d, d-shifted first feature map with the second feature map. In some embodiments, a size of the disparity-level feature distance sub-volume module is H×W×(D+1)×C, wherein H, W, and C represent height, width, and feature size, and D represents a maximum disparity the system is capable of predicting; a size of the disparity level depthwise correlation sub-volume module is H×W×(D+1)×C; and a size of the disparity-level feature concatenation sub-volume module is H×W×(D+1)×2C.

In some embodiments, the system is further configured to determine a size of the ECV module by concatenating disparity-level features of the distance sub-volume module, the disparity level depthwise correlation sub-volume module, and the disparity-level feature concatenation sub-volume module along a depth dimension, wherein the size of the ECV module is H×W×(D+1)×4C. In some embodiments, the stacked AM module includes a plurality of AM modules stacked together with shortcut connections within the stacked AM module, wherein an AM module of the plurality of AM modules of the stacked AM module is configured to process the matching cost information between the one or more feature maps from the ECV with k pairs of 3×3 atrous convolution layers and two 1×1 convolution layers. In some embodiments, the k pairs of 3×3 atrous convolution layers have dilation factors of [1, 2, 2, 4, 4, ..., k/2, k/2, k], wherein the two 1×1 convolution layers with dilation factor one are added at an end of the AM module of the plurality of AM modules for feature refinement and feature size adjusting.

In some embodiments, the one or more feature extractor modules include a first depthwise separable residual network (D-ResNet) module configured to receive the first input image and first foreground semantic information; a second D-ResNet module configured to receive the second input image and second foreground semantic information; a first AM module connected at an output of the first D-ResNet module; and a second AM module connected at an output of the second D-ResNet module. In some embodiments, the first D-ResNet module and the second D-ResNet module have shared weights and the first AM module and the second AM module have shared weights, wherein each of the first AM module and the second AM module is configured as a scene understanding module to capture deep global contextual information and local details, and wherein the ECV module is connected at an output of the first AM module and an output of the second AM module.

In some embodiments, the one or more semantic information modules include a first semantic information module connected at an output of the first AM module, wherein the first semantic information module is configured to generate the first foreground semantic information, wherein the first foreground semantic information are provided to the first D-ResNet module as an additional input to the system for the next training epoch of the system via a first feedback loop; and a second semantic information module connected at an output of the second AM module, wherein the second semantic information module is configured to generate the second foreground semantic information, wherein the second foreground semantic information are provided to the second D-ResNet module as an additional input to the for the system for the next training epoch of the system via a second feedback loop.

In some embodiments, the first semantic information module includes a first convolutional neural network (CNN) module connected at the output of the first AM module; a first up-sampling module connected at an output of the first CNN module; and a first prediction module connected at the output of the first up-sampling module and configured to generate the first foreground semantic information. In some embodiments, the second semantic information module includes a second convolutional neural network (CNN) module connected at the output of the second AM module; a second up-sampling module connected at an output of the second CNN module; and a second prediction module connected at the output of the second up-sampling module and configured to generate the second foreground semantic information. In some embodiments, the system is a multitask module configured to perform two tasks, wherein the two tasks are disparity estimation and foreground semantic information generation, wherein a loss of the system is a weighted sum of two losses from the two tasks.

According to some example embodiments of the present disclosure, a method for disparity estimation of a system including one or more feature extractor modules, one or more semantic information modules, an extended cost volume (ECV) module, a stacked atrous multiscale (AM) module, and a regression module, the method includes extracting, by the one or more feature extractor modules, one or more feature maps from one or more input images; generating one or more foreground semantic information by the one or more semantic information modules connected at one or more outputs of the one or more feature extractor modules, wherein the one or more foreground semantic information are provided to the one or more feature extractor modules; computing matching cost information between the one or more feature maps by the ECV module connected at the one or more outputs of the one or more feature extractor modules; processing the matching cost information between the one or more feature maps from the ECV module, by the stacked AM module connected at an output of the ECV module, to aggregate multiscale context information for disparity regression; estimating, by the regression module connected at an output of the stacked AM module, a disparity of the system based on the aggregated multiscale context information and foreground semantic information; and recursively training the system with the one or more feature maps and the one or more foreground semantic information until convergence.

In some embodiments, the one or more foreground semantic information of a current epoch is computed by the one or more semantic information modules in a previous epoch, wherein the one or more input images include a first input image and a second input image, wherein the one or more feature maps extracted from the one or more input images include a first feature map extracted from the first input image and a second feature map extracted from the second input image, and wherein the method further includes determining, by a disparity-level feature distance sub-volume module of the ECV module, a pixel wise absolute difference between the first feature map and the second feature map; determining, by a disparity level depthwise correlation sub-volume module of the ECV module, a correlation between the first feature map and the second feature map; and concatenating at each disparity-level d, by a disparity-level feature concatenation sub-volume module, d-shifted first feature map with the second feature map.

In some embodiments, a size of the disparity-level feature distance sub-volume module is H×W×+1)×C, wherein H, W, and C represent height, width, and feature size, and D represents a maximum disparity the system is capable of predicting; a size of the disparity level depthwise correlation sub-volume module is H×W×+1)×C; and a size of the disparity-level feature concatenation sub-volume module is H×W×(D+1)×2C.

In some embodiments, the method further includes determining a size of the ECV module by concatenating disparity-level features of the distance sub-volume module, the disparity level depthwise correlation sub-volume module, and the disparity-level feature concatenation sub-volume module along a depth dimension, wherein the size of the ECV module is H×W×(D+1)×4C. In some embodiments, the method further includes generating, by a first semantic information module of the one or more semantic information modules, first foreground semantic information;

receiving, by a first depthwise separable residual network (D-ResNet) module of the one or more feature extractor modules, the first input image and the first foreground semantic information, wherein the first foreground semantic information are provided to the first D-ResNet module as an additional input for a next training epoch of the system via a first feedback loop; generating, by a second semantic information module of the one or more semantic information modules, a second foreground semantic information; receiving, by a second D-ResNet module of the one or more feature extractor modules, the second input image and the second foreground semantic information, wherein the second foreground semantic information are provided to the second D-ResNet module as an additional input for the next training epoch of the system via a second feedback loop; and capturing deep global contextual information and local details by a first AM module and a second AM module of the one or more feature extractor modules, for scene understanding.

In some embodiments, the stacked AM module includes a plurality of AM modules stacked together with shortcut connections within the stacked AM module, wherein the method further includes processing, by an AM module of the plurality of AM modules of the stacked AM module, the matching cost information between the one or more feature maps from the ECV with k pairs of 3×3 atrous convolution layers and two 1×1 convolution layers, wherein the k pairs of 3×3 atrous convolution layers have dilation factors of [1, 2, 2, 4, 4, . . . , k/2, k/2, k], wherein the two 1×1 convolution layers with dilation factor one are added at an end of the AM module for feature refinement and feature size adjusting.

BRIEF DESCRIPTION OF THE DRAWINGS

The patent or application file contains at least one drawing executed in color. Copies of this patent or patent application publication with color drawings will be provided by the Office upon request and payment of the necessary fee.

These and other features of some example embodiments of the present disclosure will be appreciated and understood with reference to the specification, claims, and appended drawings, wherein:

DETAILED DESCRIPTION

Figure 1:
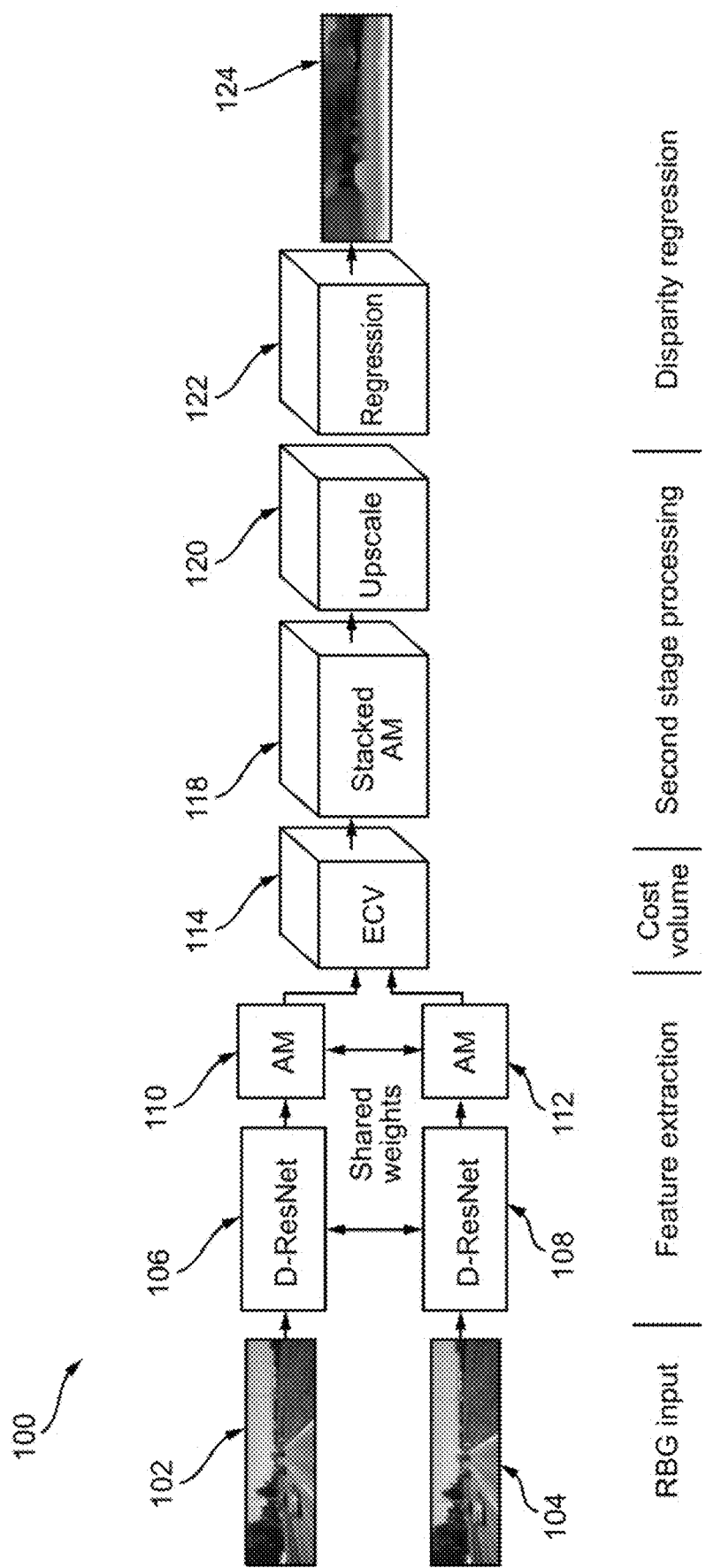
FIG. 1 illustrates a block diagram of an atrous multiscale network (AMNet), according to some embodiments of the present disclosure.

The detailed description set forth below in connection with the appended drawings is intended as a description of some example embodiments of a foreground-background-aware atrous multiscale network for disparity estimation provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Depth estimation is a fundamental computer vision problem aiming to predict a measure of distance of each point in a captured scene. There has been recent interest in the estimation of the real world depth of elements in a captured scene. This has many applications such as the capability of separating the foreground (close) objects from the background (far) objects. Accurate depth estimation allows separation of the foreground objects of interest from the background in a scene. Accurate foreground-background separation allows one to process the captured images to emulate effects such as the Bokeh effect. Bokeh is the soft out-of-focus blur of the background which is mastered by using the right settings in expensive cameras with fast lenses, and wide apertures, as well as making the cameras closer to the subject and the subject further away from the background to emulate the shallow depth-of-field. Thus, accurate depth estimation allows processing images from non-professional photographers or cameras with smaller lenses (such as mobile phone cameras) to obtain more aesthetically pleasant images with the Bokeh effect which focus on the subject. Other applications of accurate depth estimation include three-dimensional (3D) object reconstruction and virtual reality applications, where it is desired to change the background or the subject and render them according the desired virtual reality. Other applications of accurate depth estimation from the captured scene is for car automation, surveillance cameras, self-driving applications, and enhanced safety by improving the object detection accuracy and estimation of its distance from the camera using the camera only, or from camera input as well as depth estimation from multiple sensors.

Given a rectified stereo image pair, depth estimation may be converted to disparity estimation with camera calibration. For each pixel in one image, disparity estimation finds the shifts between one pixel and its corresponding pixel in the other image on the same horizontal line so that the two pixels are the projections of a similar 3D position.

Some embodiments of the present disclosure provide a system and a method for estimation of the real world depth of elements in a scene captured by two stereo cameras. Two stereo rectified images are captured and processed to accurately calculate the disparity between pixels in both images. The pipeline of the stereo-matching disparity estimation system includes three parts: feature extraction from left and right images captured by a stereo camera, matching cost computing between left and right feature maps, and post-processing by a scene understanding module, and disparity regression.

Some embodiments of the present disclosure provide designs for parts of the disparity estimation system. For example, an extended cost volume module for matching cost computing is provided. The extended cost volume module includes an original cost volume module, a disparity-level correlation module, and a disparity-level difference module. A stacked atrous convolution module with skip connections within for post-processing is also provided. The soft-classification based regression is used for disparity regression. Some embodiments of the present disclosure may be applicable to object segmentation.

Some embodiments may utilize semantic information, specifically using semantic segmentation or semantic boundary information of foreground objects, to reinforce the disparity estimation task. Foreground semantic information may be used in two ways, for example, adding one more task to the disparity estimation network for foreground semantic segmentation/boundary prediction and using the foreground semantic segmentation or boundary map as an additional input feature besides the red-green-blue (RGB) image (RGB-S input). The two methods may be further combined together within one network. The multi-task network with RGB-S input is trained recursively where input semantic map of the current epoch is computed by the multi-task network in the previous epoch.

Some embodiments of present disclosure provide a deep learning architecture for disparity estimation with designs of the first three components, for example, feature extractor, cost volume, second stage processing module. In some embodiments, the example network adopts a depthwise separable convolution based feature extractor, a cost volume to capture matching costs with different similarity measures, and a scene understanding module to aggregate rich multi-scale contextual information with atrous convolutions. The cost volume to capture matching costs with different similarity measures are described in details with respect to FIG. 3. Some embodiments of the present disclosure also provide a multitask network which utilizes foreground-background segmentation information to enhance itself with better foreground-background awareness. In some embodiments, the example network is trained end-to-end using an iterative training method. In some embodiments, the present training method outperforms related-art methods with significant margins and achieves the state-of-the-art on three most popular disparity estimation benchmarks: KITTI stereo 2015, KITTI stereo 2012, and Sceneflow.

A convolutional neural network (CNN) based disparity estimation system may include feature extraction, matching cost estimation, second stage processing, and disparity regression. The feature extractor extracts discriminative high-level feature maps from the left and right input images, choices can be a residual network. The cost volume computes the matching cost between the left and right feature maps. Correlation, pixel-wise difference, or simple concatenation are commonly used for cost volume computation. The post-processing module further processes and refines the output from the cost volume with a set of convolutional layers or a scene understanding module. Finally, the disparity regressor or the disparity classifier makes the pixel-wise disparity prediction.

For example, in a CNN based disparity estimation system, first, deep features is extracted from the rectified left and right images using a CNN based feature extractor such as a residual network (ResNet)-50 or a VGG-16. Then, a cost volume (CV) is formed by measuring the matching cost between the left and the right feature maps. Choices for the matching cost may include correlation, absolute distance, and/or feature concatenation. The CV is further processed and refined by a second stage processing module for disparity regression. Furthermore, information from other low-level vision tasks such as semantic segmentation or edge detection may be used to reinforce the disparity estimation system.

FIG. 1 illustrates a block diagram of an atrous multiscale network (AMNet) 100, according to some embodiments of the present disclosure. The AMNet 100 is a CNN based disparity estimation system. The AMNet 100 of FIG. 1 includes a first depthwise separable ResNet (D-ResNet) 106, and a second D-ResNet 108, a first atrous multiscale (AM) module 110, a second AM module 112, an extended cost volume (ECV) module 114, a stacked AM module 118, an upscale module 120, and a regression module 122.

In the example embodiment of FIG. 1, a standard ResNet-50 backbone is modified to a D-ResNet (e.g., 106, 108) as backbone of the AMNet 100. In the AMNet 100 of FIG. 1, the first D-ResNet 106 receives a first input image 102 and the second D-ResNet 108 receives the second input image 104 as inputs. The first D-ResNet 106 and the second D-ResNet 108 may have shared weights. The first AM module 110 is connected to an output of the first D-ResNet 106 and the second AM module 112 is connected to an output of the second D-ResNet 108. The AM module 110 and the AM module 112 may also have shared weights.

Each of the AM modules 110 and 112 is designed as a scene understanding module that captures deep global contextual information as well as local details. In some embodiments, a D-ResNet module (e.g., the first D-ResNet 106, the second D-ResNet 108) followed by an AM module (e.g., 110, 112) may be used as the feature extractor. Therefore, the combination of the first D-ResNet 106 and first AM module 110 may be used to extract features of the first input image 102, and the combination of the second D-ResNet 108 and the second AM module 112 may be used to extract features of the second input image 104.

The ECV module 114 is connected to the outputs of the AM modules 110 and 112. The ECV module 114 is a combination of a disparity level depthwise correlation sub-volume, a disparity-level feature distance sub-volume, and a disparity-level feature concatenation sub-volume. The ECV module 114 carries rich information about the matching costs in different similarity measures. The ECV module 114 may be processed by the stacked AM module 118 (connected at the output of the ECV module 114) and may predict disparities with the soft argmin based disparity regression. In some embodiments, argmin is the argument that minimizes the cost function.

In some embodiments, foreground-background segmentation information may be utilized to reinforce disparity estimation. The AMNet 100 may be extended to a foreground-background-aware AM-Net (FBA-AMNet), which utilizes foreground-background segmentation to improve disparity estimation. The foreground-background segmentation map may be provided to the AMNet 100 as an additional input feature (RGB-S input) to the AMNet 100 and the AMNet 100 is extended to be a multi-task network, in which the main task is disparity estimation and the auxiliary task is foreground-background segmentation. In some embodiments, the multi-task network is called a FBA-AMNet. The auxiliary task helps the network (e.g., FBA-AMNet) have better foreground-background awareness so as to further improve disparity estimation.

Aspects of various components of the AMNet 100 will now be described in more detail in the following sections.

Figure 2B:
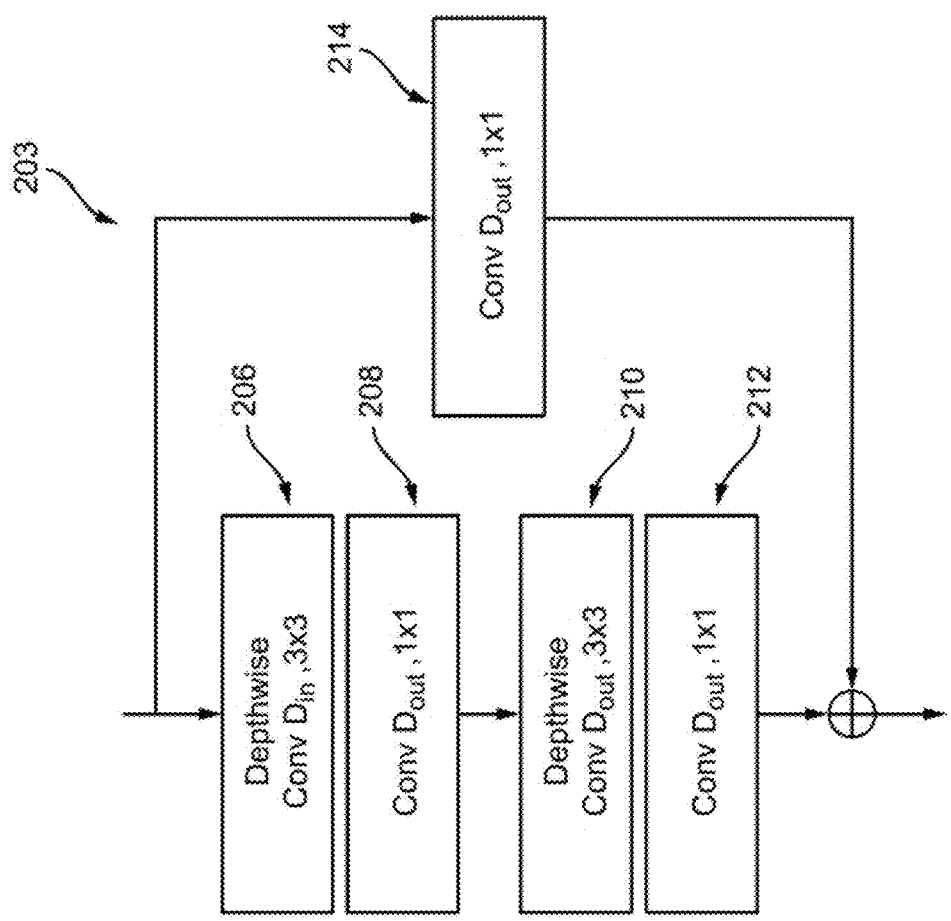
FIG. 2B illustrates a block diagram of a depthwise separable ResNet (D-ResNet) block, according to some embodiments of the present disclosure.
Figure 2A:
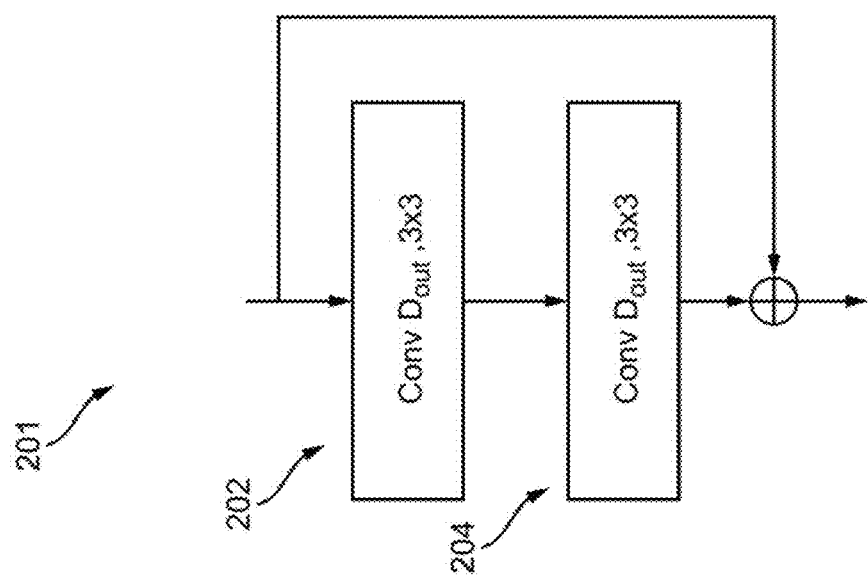
FIG. 2A illustrates a block diagram of a residual network (ResNet) block, according to some embodiments of the present disclosure.

FIG. 2A illustrates a block diagram of a ResNet 201 block, according to some embodiments of the present disclosure, and FIG. 2B illustrates a block diagram of a D-ResNet 203 block, according to some embodiments of the present disclosure. The D-ResNet 203 block may be the first D-ResNet 106 or the second D-ResNet 108 of the AMNet 100 of FIG. 1.

Depthwise separable convolution decomposes a standard convolution into a depthwise convolution (e.g., 206 or 210) followed by a 1×1 convolution (e.g., 208 or 212). Depthwise separable convolution has shown great potential on image classification task and has been further developed for other computer vision tasks as a network backbone. In the example embodiment of D-ResNet 203, the standard convolutions are replaced with customized depthwise separable convolutions in a standard ResNet-50 (e.g., ResNet 201) backbone.

A standard 3×3 convolutional layer in a ResNet-50 (e.g., ResNet 201) backbone contains $9 \times D_{in} \times D_{out}$ parameters, while a depthwise separable convolutional layer (e.g., D-ResNet 203) contains $D_{in} \times (9+D_{out})$ parameters, where $D_{in}$ and $D_{out}$ represent sizes of the input and output feature maps, respectively. Because $D_{out}$ in a ResNet model may be, for example, 32 or larger, a direct replacement of a standard convolution (e.g., 202 or 204) with a depthwise separable convolution (e.g., a depthwise convolution 206 followed by a 1×1 convolution 208 or a depthwise convolution 210 followed by a 1×1 convolution 212) will result in a model with much less complexity. In the example embodiment of D-ResNet 203, $D_{out}$ has been further increased in the depthwise separable convolutional layers (a depthwise convolution 206 followed by a 1×1 convolution 208 or a depthwise convolution 210 followed by a 1×1 convolution 212) so as to make the number of parameters in the D-ResNet 203 close to the ResNet-50 (e.g., ResNet 201).

For each D-ResNet block (e.g., 203) modified from a ResNet block (e.g., 201), 1×1 convolution (e.g., 214) is implemented to the input feature map in the shortcut connection for feature size matching.

FIGS. 2A and 2B show a comparison between a standard ResNet block (e.g., ResNet 201) and a D-ResNet block (e.g., D-ResNet 203). The network specifications of the D-ResNet (e.g., D-ResNet 203) backbone are listed in Table 1. Rectified Linear Unit (ReLU) and Batch Normalization are used after each layer. After the D-ResNet (e.g., D-ResNet 203) backbone, the shape of the feature map is ¼ of the shape of the input image.

Figure 5A:
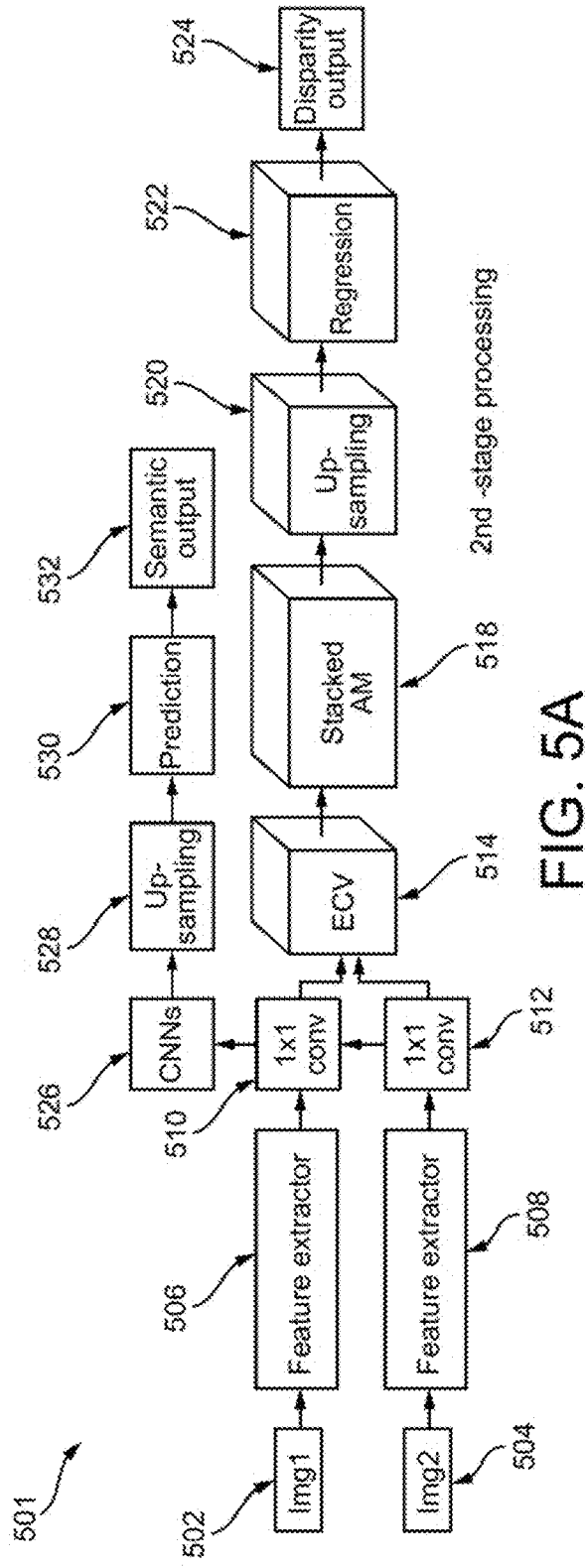
FIG. 5A illustrates a multi-task network, according to some embodiments of the present disclosure.
Figure 5B:
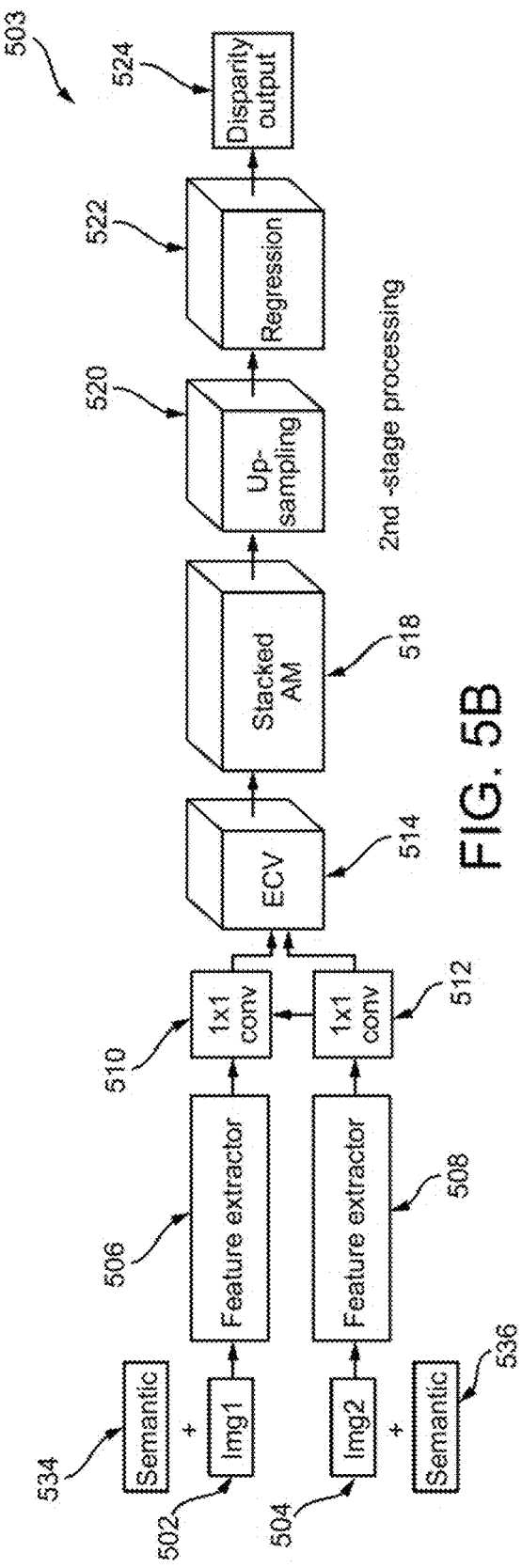
FIG. 5B illustrates another multi-task network, according to some embodiments of the present disclosure.

In some embodiments, the 50-layer residual network (e.g., ResNet 201) may be modified in PSMNet as a feature extractor, which constitutes of 4 groups of residual blocks, where each residual block constitutes of two convolutional layers with 3×3 convolutional kernels. The number of residual blocks in the 4 groups are {3; 16; 3; 3} respectively. In PSMNet's ResNet, the number of output feature maps are $D_{out}$={32; 64; 128; 128} for the four residual groups, respectively, where $D_{in}=D_{out}$ for all the residual blocks. Since $D_{out}$ is 32 or larger, a direct replacement of the standard convolutions with a depthwise separable convolution will result in a model with much less number of parameters. However, in the present D-ResNet (e.g., D-ResNet 203), $D_{out}$ is increased for the depthwise separable convolutional layers in four residual blocks to be $D_{out}$={96; 256; 256; 256}, respectively, where $D_{in}$=32 for the first block, so as to make the number of parameters in the present D-ResNet (e.g., D-ResNet 203) close to that of PSMNet. Thus, the present D-ResNet (e.g., D-ResNet 203) can learn more deep features than ResNet (e.g., ResNet 201) while having a similar complexity. Since the depth-separable residual blocks (e.g., 206, 210) may not have the same number of input and output features, $D_{out}$ pointwise 1×1 projection filters may be deployed on the shortcut (residual) connection to project the $D_{in}$ input features onto the $D_{out}$ features (for example, FIGS. 5A and 5B show a comparison between a standard ResNet (FIG. 5A) and the D-ResNet (FIG. 5B)). ReLU and batch normalization are used after each layer. After the D-ResNet backbone, the widths and heights of the output feature maps are ¼ of those of the input image. The network specifications of the D-ResNet backbone are listed in Table I.

TABLE 1

Detailed layer specifications of the D-ResNet.

| Index | Type | D□□□ | Str. | Dil. | Repeat |
|---|---|---|---|---|---|
| 1 | Sepconv | 32 | 2 | 1 | 1 |
| 2-3 | Sepconv | 32 | 1 | 1 | 2 |
| 4-6 | D-ResNet block | 96 | 1 | 1 | 3 |
| 7 | D-ResNet block | 256 | 2 | 1 | 1 |
| 8-25 | D-ResNet block | 256 | 1 | 1 | 18 |
| 26-28 | D-ResNet block | 256 | 1 | 2 | 3 |

'Repeat' means the current layer or block is repeated a certain number of times. 'Str.' and 'Dil.' refer to stride and dilation factor (e.g., in some embodiments, stride is the step or amount of shift when a filter is slided, and dilation factor is the ratio of enlargement or up-sampling of the filter after inserting zeros).

Figure 3:
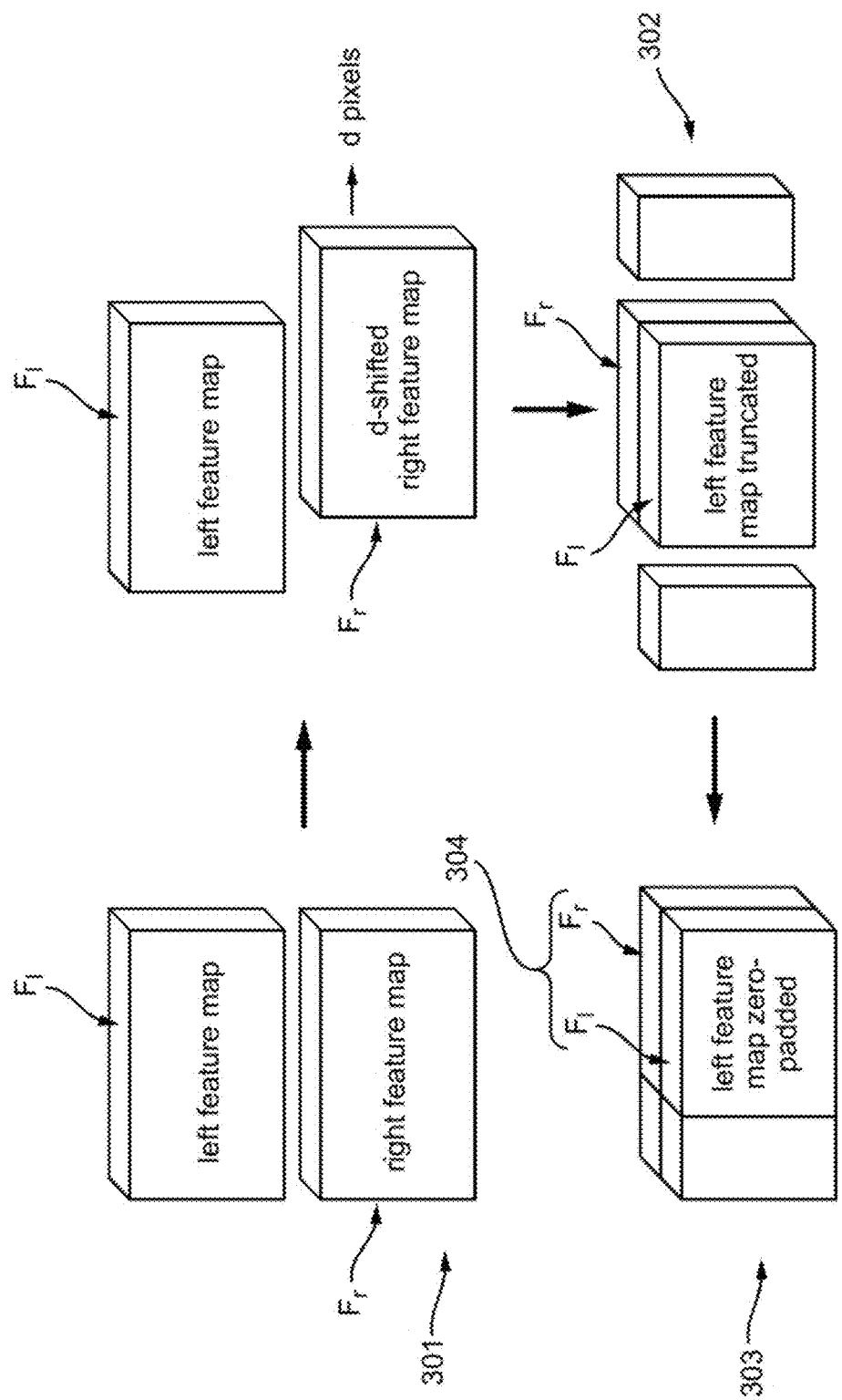
FIG. 3 illustrates development of an extended cost volume (ECV) module, according to some embodiments of the present disclosure.

FIG. 3 illustrates development of an ECV module to compute the matching cost between feature maps of a pair of stereo images, according to some embodiments of the present disclosure. The ECV module may be the ECV module 114 of FIG. 1.

ECV module 114 is developed to summarize three different matching costs between the left ($F_l$) and the right ($F_r$) feature maps across all disparity levels. The ECV module 114 may include three sub-volumes, for example, disparity-level feature distance sub-volume, disparity-level depthwise correlation sub-volume, and disparity-level feature concatenation sub-volume.

Given the maximum disparity the AMNet (e.g., AMNet 100) is capable of predicting as D, one disparity level refers to a disparity value d from 0 to D at which $F_r$ is shifted d pixels to the right to align with $F_l$ with necessary trimming and zero-padding. For example, for one disparity-level d, the right feature map $F_r$ is firstly shifted d pixels to the right-side (e.g., 301), and then is concatenated with the left feature map $F_l$ (e.g., 302). The out-of-boundary parts of the two feature maps $F_l$ and $F_r$ are removed (e.g., 302) and zero-padding is performed (e.g., 303) to pad the new feature map (e.g., 304) to be the same width as the original left feature map $F_l$ (e.g., 303). The process is shown in FIG. 3.

In some embodiments, in disparity-level feature distance sub-volume, the point-wise (e.g., pixel wise) absolute difference between $F_l$ and $F_r$ is computed across all disparity levels. Given the size of $F_l$ as H×W×C, where H, W, and C represent the height, width, and feature size, all the D+1 difference maps are packed together to form a sub-volume of size H×W×+1)×C. In some embodiments, in (D+1), 1 is the disparity map between left $F_l$ and right $F_r$ features without any shift. The method is repeated for D times until the maximum disparity shift D of the left image with respect to the right image is achieved.

For example, at each disparity-level d, after aligning the d-shifted right feature map $F_r$ and the left feature map $F_l$, the pixel-wise absolute difference is computed. All the (D+1) difference maps are packed together to form a sub-volume of size H×W×(D+1)×C.

In disparity-level depthwise correlation sub-volume, the correlation between a patch $p_1$ centered at $x_1$ in $F_l$ with a patch $p_2$ centered at $x_2$ in $F_r$ is defined for a square patch of size 2t+1 (e.g., "t" is a parameter) as Equation 1:

$$c(x_1,x_2)=\Sigma_{o\in[-t,t]\times[-t,t]}<F_l(x_1+o),F_r(x_1+o)>. \quad (1)$$

Therefore, instead of computing correlations between $p_1$ with all other patches centered at values within a neighborhood of size D of $x_1$ (e.g., expand along the horizontal line), correlations between $p_1$ and its corresponding patches in the aligned $F_r$ across all disparity levels (e.g., expand along the disparity level) are computed. This results in a sub-volume of size H×W×(D+1)×C. To make the size of the output feature map comparable to other sub-volumes, depthwise correlation may be implemented. At each disparity level, the depthwise correlations of two aligned patches are computed and packed across all depth channels as Equation 2 and Equation 3 (below).

$$c^i(x_1,x_1)=\Sigma_{o\in[-t,t]\times[-t,t]}F_l^i(x_1+o),F_e^i(x_1+o), \quad (2)$$

$$c(x_1,x_1)=[c^0(x_1,x_1),c^1(x_1,x_1), \ldots , c^c(x_1,x_1)], \quad (3)$$

The depthwise correlation is computed for all patches across all disparity levels, which leads to a sub-volume of size H×W×(D+1)×C.

In disparity-level feature concatenation sub-volume, at each disparity-level d, the d-shifted right feature map $F_r$ is directly concatenated with the left feature map $F_l$. All the D+1 concatenated feature maps are packed together to form a sub-volume of size H×W×(D+1)×2C. In some embodiments, for each shift of left feature in the left feature map $F_l$, a difference map is calculated.

Finally, all the sub-volumes of ECV are concatenated along the depth dimension, which leads to the ECV of size H×W×(D+1)×4C. The ECV is able to provide the following modules (e.g., stacked AM, regression) in the system (e.g. AMNet 100) with rich information to describe the matching costs in different ways of the left $F_l$ and right $F_r$ feature maps at all disparity levels. In some embodiments, by introducing the disparity dimension into the ECV module (e.g., ECV module 114), 3D convolution is implemented in the following convolutional layers (e.g., stacked AM module 118) in the network (e.g., AMNet 100).

Figure 4:
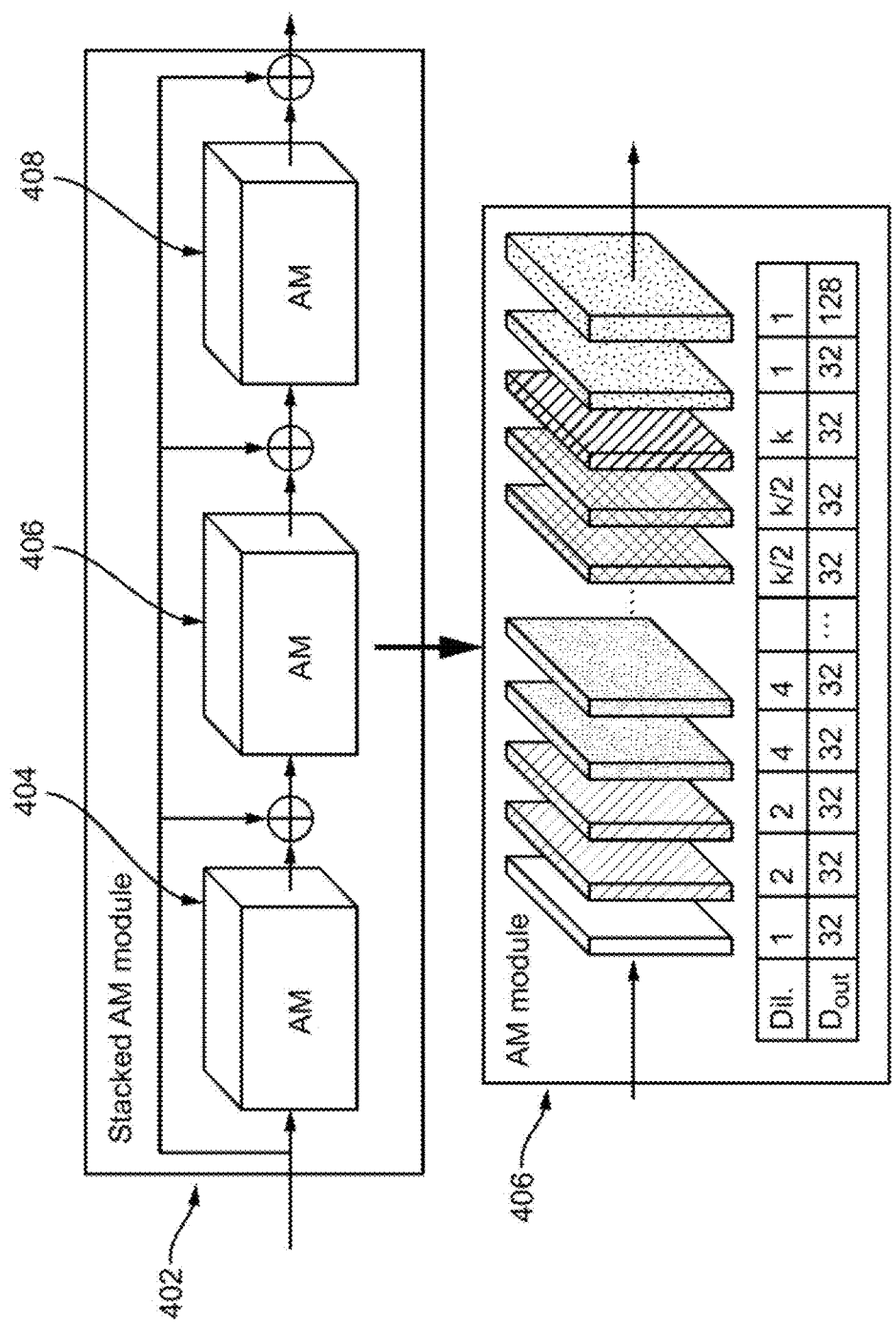
FIG. 4 illustrates structures and specifications of an atrous multiscale (AM) module and a stacked AM module, according to some embodiments of the present disclosure.

FIG. 4 illustrates structures and specifications of an AM module and a stacked AM module, according to some embodiments of the present disclosure. In FIG. 4, 'Dil.' represents a dilation factor in each atrous convolutional layer.

The stacked AM module 402 of FIG. 4 is a second stage processing module, which is connected at the output of the ECV module. The stacked AM module 402 processes the output (e.g., matching cost information between the left $F_l$ and right $F_r$ feature maps at all disparity levels) from the ECV module to aggregate multiscale context information for disparity regression.

In CNN-based low-level vision systems, atrous convolution and scene understanding modules may be utilized to aggregate multiscale context information for dense disparity predictions. The stacked AM module of FIG. 4 may be used as a scene understanding module. The stacked AM module 402 of FIG. 4 includes three AM blocks 404, 406, and 408. The three AM blocks 404, 406, and 408 are stacked together with shortcut connections within to form the stacked AM module 402. In some embodiments, shortcut connections are connections between neural network layers that skip over some intermediate layers.

An AM block is a block of convolution layers with an encoder-decoder structure. An AM block may process the input feature map with k pairs of a 2-stride convolution layer and a 1-stride convolution layer as the encoder part. A choice of k can be, for example, 3, 4, or 5. Then, a set of deconvolution layers are implemented as the decoder part to further process and upscale the feature map to its original size.

In some embodiments, in the stacked AM module 402, all the convolution layers in the encoder of each of the AM blocks (e.g., 404, 406, and 408) are atrous convolution layers (e.g., in FIG. 4, only AM block 406 is expanded, however, all the convolution layers in each of the AM blocks 404 and 408 are also atrous convolution layers similar to AM block 406). The dilation factors in each of the AM blocks (e.g., 406) may be increased by a multiple of two. Because atrous convolution naturally carries more information and keeps the size of the feature map, the decoder part may be removed and two extra convolution layers may be added for feature refinement at the end. For example, the stacked AM block 406 is designed as a set of 3×3 atrous convolutions with different dilation factors:

$$\left[1, 2, 2, 4, 4, \ldots, \frac{k}{2}, \frac{k}{2}, k\right].$$

The dilation factor increases as the AM block 406 goes deeper to capture dense multiscale contextual information without losing spatial resolution. In the AM block 406, two 1×1 convolutions with dilation factor one are added at the end for feature refinement and feature size adjusting.

To aggregate more coarse-to-fine contextual information, a cascade of three AM modules, for example, 404, 406, and 408, is implemented with shortcut connects within to form the stacked AM module 402.

As discussed with respect to FIG. 1, an AM module (e.g., 110, 112) after the D-ResNet (e.g. 106, 108) backbone may be used to form the feature extractor and a stacked AM module (e.g., 118) after the ECV (e.g., 114) may be used as the second stage processing module. The 3D convolution is implemented in the stacked AM module (e.g., 118).

In some embodiments, the upscale module 120 may be an up-sampling module that renders the input feature to a higher resolution.

In some embodiments, the soft argmin operation may be adopted for disparity regression (e.g., in regression module 122). For one output layer, the expectation of the D+1 disparities is computed as the final disparity prediction, as shown in Equation 4:

$$d_i = \Sigma_{j=0}^{D} j \times p_i^j \quad (4)$$

where $p_i^j$ is softmax probability of disparity j at pixel i and D is the maximum disparity value.

For example, predicted disparity $d_i$ may be based on the aggregated multiscale context information from the stacked AM module (e.g., 118, 402). In some embodiments, the stacked AM module (e.g., 118, 402) generates higher level features based on the concatenated feature maps in the ECV module (e.g., 114), which are then used to estimate the disparity $d_i$. This is called cost aggregation and disparity computation.

The smooth loss $L_1$ may be used to measure the difference between the predicted disparity $d_i$ and the ground-truth disparity $d_i^{gt}$. The loss is computed as the average smooth $L_1$ loss over all labeled pixels. During training, three losses are computed separately from the three AM blocks (e.g., 404, 406, and 408) in the stacked AM module (e.g., 402) and summed up to form the final loss, as shown in Equation (5) and (6).

$$L_{AM}(d_i, d_i^{gt}) = \frac{1}{N} \sum_i smooth_{L1}(d_i - d_i^{gt}), \quad (5)$$

$$L = L_{AM_1} + L_{AM_2} + L_{AM_3}, \quad (6)$$

where N is the total number of labeled pixels. In some embodiments, the AMNet (e.g., AMNet 100) may be trained with the final loss $L = L_{AM_1} + L_{AM_2} + L_{AM_3}$, and implements the knowledge from such training in calculating the final disparity $d_i$ or generating the disparity map 124.

During testing, only the output from the final AM module (e.g., 408) is used for disparity regression. Based on the disparity regression, final disparity $d_i$ may be predicted (e.g., disparity map 124 may be generated).

Some embodiments of the present disclosure provide a system with disparity estimation as the main task while utilizing semantic information to help disparity estimation. Semantic information such as semantic segmentation maps and semantic boundaries define each object's category and location in one image. It helps the system to understand images better and further helps disparity estimation. For a disparity estimation network, the goal is to predict disparity values for all pixels. Given the fact that disparity changes drastically at the locations where foreground objects appear, adding prior information which describes foreground objects will benefit the system for precise disparity estimation. Also, a better awareness of foreground objects may lead to better disparity estimation. In some embodiments, in outdoor driving scenes such as KITTI, foreground objects are defined as vehicles and humans. In some embodiments, foreground-background segmentation map may be utilized to improve disparity estimation. In some embodiments, only the foreground and background pixels are differentiated. The exact categories of foreground objects are not concerned. Also, in some embodiments, only the semantic information for foreground objects are considered, the exact category of foreground objects are not considered.

There are two common methods to utilize foreground-background segmentation information or foreground semantic information into a disparity estimation system (e.g., AMNet 100).

The first method is to extend the network to a multi-task network, where the main task is the disparity estimation and the side task is foreground segmentation or foreground semantic boundary prediction. FIG. 5A illustrates a multi-task network 501, according to some embodiments of the present disclosure. The multi-task network 501 is designed to have a shared base, and different heads for the two tasks. For example, in the multi-task network 501, the two tasks share a same base at the beginning of the network structure and have separate heads at the end of the network structure 501. The shared base may include input images 502 and 504, feature extractors 506 and 508, 1×1 convolution modules 510 and 512, an ECV module 514, a stacked AM module 518, an up-sampling module 520, and a regression module 522. In the multi-task network 501, the shared base may be the AMNet 100 of FIG. 1. For example, the feature extractors 506 and 508 may be the D-ResNets 106 and 108, the 1×1 convolution modules 510 and 512 may be the AM modules 110 and 112, the ECV module 514 may be the ECV module 114, the stacked AM module 518 may be the stacked AM module 118, the up-sampling module 520 may be the upscale module 120, and the regression module 522 may be the regression module 122 of FIG. 1. The shared base may be used for generating disparity output 524 (e.g., disparity estimation). A CNN module 526 (connected at output of the 1×1 convolution module 510) followed by an up-sampling module 528 and a prediction module 530 may be used to generate the semantic output 532 (e.g., foreground segmentation or foreground semantic boundary prediction).

The total loss function of the multi-task network 501 is a weighted summation of the two tasks. Due to the data imbalance in the side task (e.g., foreground segmentation or foreground semantic boundary prediction), the weights for the foreground pixels or the foreground semantic boundaries in the loss function are increased. By optimizing the multi-task network 501 towards both tasks, the shared base is trained to have better awareness of foreground objects implicitly, which leads to better disparity estimation.

The second method is to directly feed the extra foreground-background segmentation information as an additional input besides the RGB image (RGB-S input) to guide the disparity estimation network. This requires accurate segmentation maps in both training and testing stages. FIG. 5B illustrates another multi-task network 503, according to some embodiments of the present disclosure, for the second method. The network 503 may be AMNet 100 of FIG. 1 with the extra foreground-background segmentation information as an additional input. For example, feature extractors 506 and 508 may be D-ResNets 106 and 108, the 1×1 convolution modules 510 and 512 may be the AM modules 110 and 112, the ECV module 514 may be the ECV module 114, the stacked AM module 518 may be the stacked AM module 118, the up-sampling module 520 may be the upscale module 120, and the regression module 522 may be the regression module 122 of AMNet 100 of FIG. 1. In some embodiments, either a foreground segmentation map or a foreground semantic boundary map may be used as another input feature (e.g., 534, 536) to the disparity estimation network 503 besides the RGB image (e.g., 502, 504). This forms a RGB-S input to the network 503. The extra input signal (e.g., 534, 536) sends a prior knowledge to the network 503 for a better image understanding. In this way, the better image understanding feature comes from the extra input (534, 536). The network 503 is not trained to understand images better.

Because both of the two techniques (as discussed with respect to FIGS. 5A and 5B) boost performance of the disparity estimation task, the two techniques may be combined together in one single system.

Figure 6:
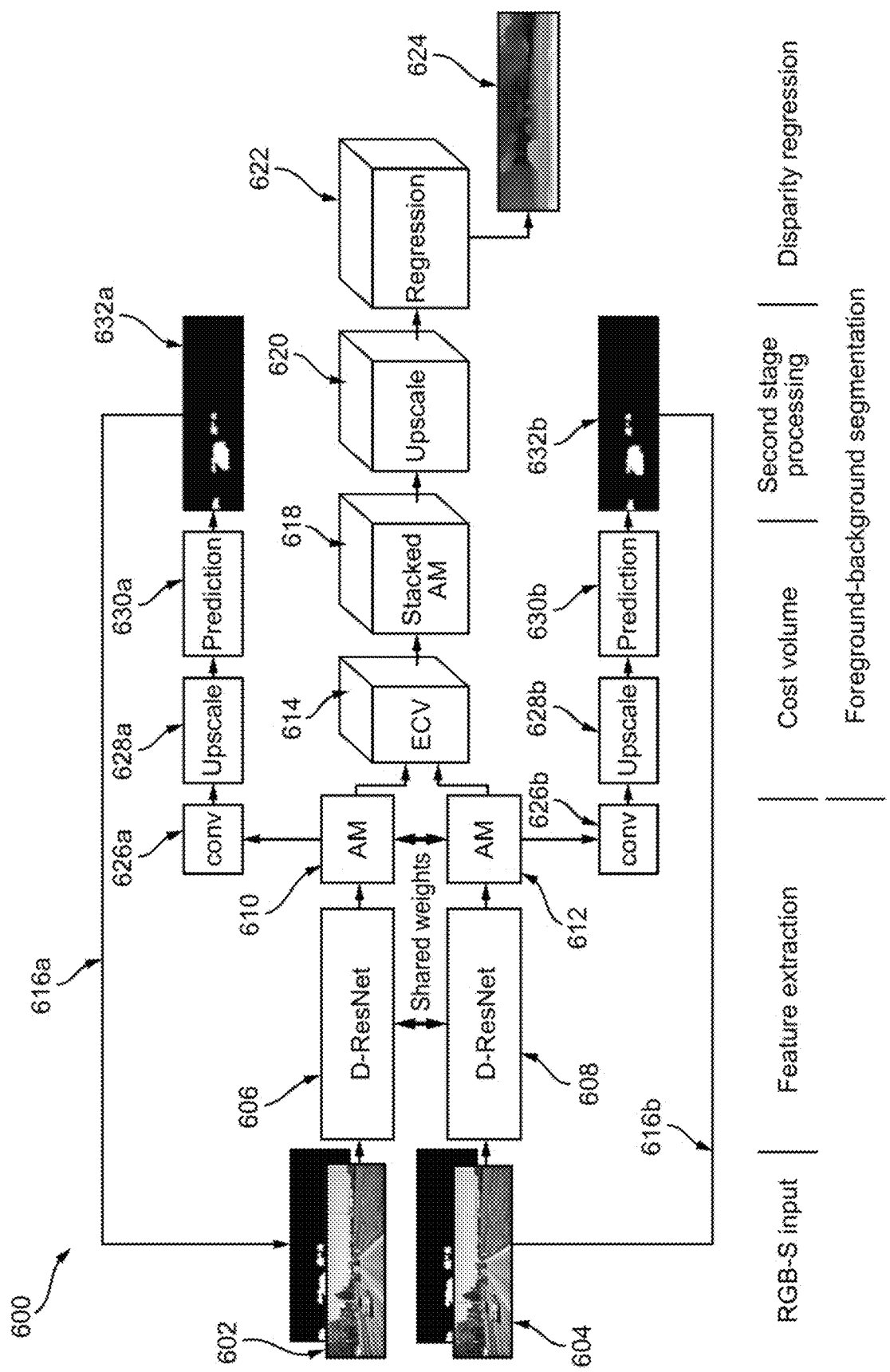
FIG. 6 illustrates a FBA-AMNet system, according to some embodiments of the present disclosure.

FIG. 6 illustrates a FBA-AMNet 600 system, according to some embodiments of the present disclosure. The AMNet 100 of FIG. 1 may be extended to the FBA-AMNet 600. The FBA-AMNet 600 is designed as a multi-task network which takes RGB-S input (as discussed with respect to FIGS. 5A and 5B).

FBA-AMNet 600 includes a first D-ResNet 606 configured to receive a first input image 602 and first foreground semantic information 632a, a second D-ResNet 608 configured to receive a second input image 604 and second foreground semantic information 632b. The FBA-AMNet 600 further includes a first AM module 610 connected at the output of the first D-ResNet 606, a second AM module 612 connected at the output of the second D-ResNet 608, an ECV module 614, a stacked AM module 618, an upscale module 620, and a regression module 622.

The first D-ResNet 606 and the second D-ResNet 608 may have shared weights. The first AM module 610 and the second AM module 612 may also have shared weights. Each of the first and second AM modules 610 and 612 is designed as a scene understanding module that captures deep global contextual information as well as local details. In some embodiments, the combination of the first D-ResNet 606 and first AM module 610 may be used to extract features of the first input image 602 and the combination of the second D-ResNet 608 and the second AM module 612 may be used to extract features of the second input image 604.

The ECV module 614 is connected to the outputs of the first and second AM modules 610 and 612. The ECV module 614 is a combination of a disparity level depthwise correlation sub-volume, a disparity-level feature distance sub-volume, and a disparity-level feature concatenation sub-volume. The ECV module 614 carries rich information about the matching costs in different similarity measures. The stacked AM module 618 is a second stage processing module, which is connected at the output of the ECV module 614. The stacked AM module 618 processes the output (e.g., matching cost information between the left $F_l$ and right $F_r$ feature maps at all disparity levels) from the ECV module 614 to aggregate multiscale context information for disparity regression. Disparity regression may be calculated at the regression module 622 and based on the disparity regression, final disparity $d_i$ may be predicted (e.g., disparity map 624 may be generated).

A first CNN module 626a (connected at output of the first AM module 610) followed by a first up-sampling module 628a and a first prediction module 630a may be used to generate the first semantic output 632a (e.g., foreground-background segmentation map or foreground semantic information) and a second CNN module 626b (connected at output of the second AM module 612) followed by a second up-sampling module 628b and a second prediction module 630b may be used to generate the second semantic output 632b (e.g., foreground-background segmentation map or foreground semantic information). In some embodiments, the CNN modules 626a and 626b may be multi-layer neural networks. In some embodiments, the first up-sampling module 628a and the second up-sampling module 628b may be used to render the input features to a higher resolution.

The FBA-AMNet 600 is trained iteratively (or recursively) by feeding the semantic outputs 632a and 632b (e.g., foreground-background segmentation maps) via feedback loops 616a and 616b at the current epoch as the extra segmentation inputs to itself at the next epoch.

For example, at epoch 0, the input foreground semantic information to the multi-task network is initialized as zeros.

At epoch K, the input foreground semantic information (e.g., 632a, 632b) for one image to the network is the output from the network for this image at epoch K-1.

This process is repeated until convergence.

In some embodiments, at the inference stage (e.g., at the first prediction module 630a and the second prediction module 630b), the segmentation task (e.g., foreground-background segmentation) can be ignored and zero maps are fed as the extra input representing the foreground-background segmentation map (e.g., 632a and 632b). Although, the segmentation task (e.g., foreground-background segmentation) is ignored, performance of the FBA-AMNet system 600 is already improved, since the network (e.g., including the first CNN module 626a followed by the first up-sampling module 628a and the first prediction module 630a or including the second CNN module 626b followed by the second up-sampling module 628b and the second prediction module 630b) estimates the foreground-background segmentation map (e.g., 632a and 632b) and implicitly learns the foreground object boundaries.

In some embodiments, two inference iterations are run, where the zero maps are fed at first iteration, and the foreground-background segmentation map (e.g., 632a and 632b) output from the first iteration, is used as the additional input for the second iteration.

All layers in the feature extractor (e.g., 606, 608, 610, and 612) are shared between the two tasks (e.g., disparity estimation 624 and foreground-background segmentation predictions (e.g., foreground semantic information 632a and 632b). Beyond the feature extractor, a binary-classification layer (626a, 626b), an up-sampling layer (628a, 628b), and a softmax layer (630a, 630b) are added for foreground-background segmentation (e.g., 632a, 632b).

During training, the FBA-AMNet 600 keeps refining and utilizing its foreground-background segmentation predictions (e.g., 632a, 632b) so as to learn better awareness of foreground objects. The loss of the FBA-AMNet 600 is computed as a weighted sum of the two losses from the two tasks:

$L = L_{disp} + \lambda L_{seg}$, where $\lambda$, is the weight for $L_{seg}$, $L_{disp}$ represents loss in disparity estimation (e.g., 624) and $L_{seg}$ represents loss in foreground-background segmentation predictions (e.g., 632a, 632b). During testing, the segmentation task is ignored and zero maps are used as the extra input.

Due to the data imbalance in the side task (e.g., foreground-background segmentation prediction), the weights for the foreground pixels or the foreground semantic boundaries in the loss function are increased. By optimizing the multi-task FBA-AMNet 600 towards both tasks (e.g., foreground-background segmentation and disparity prediction), the shared base (606, 608, 610, 612, 614, 618, 620, 622) is trained to have better awareness of foreground objects implicitly, which leads to better disparity estimation.

Figure 7:
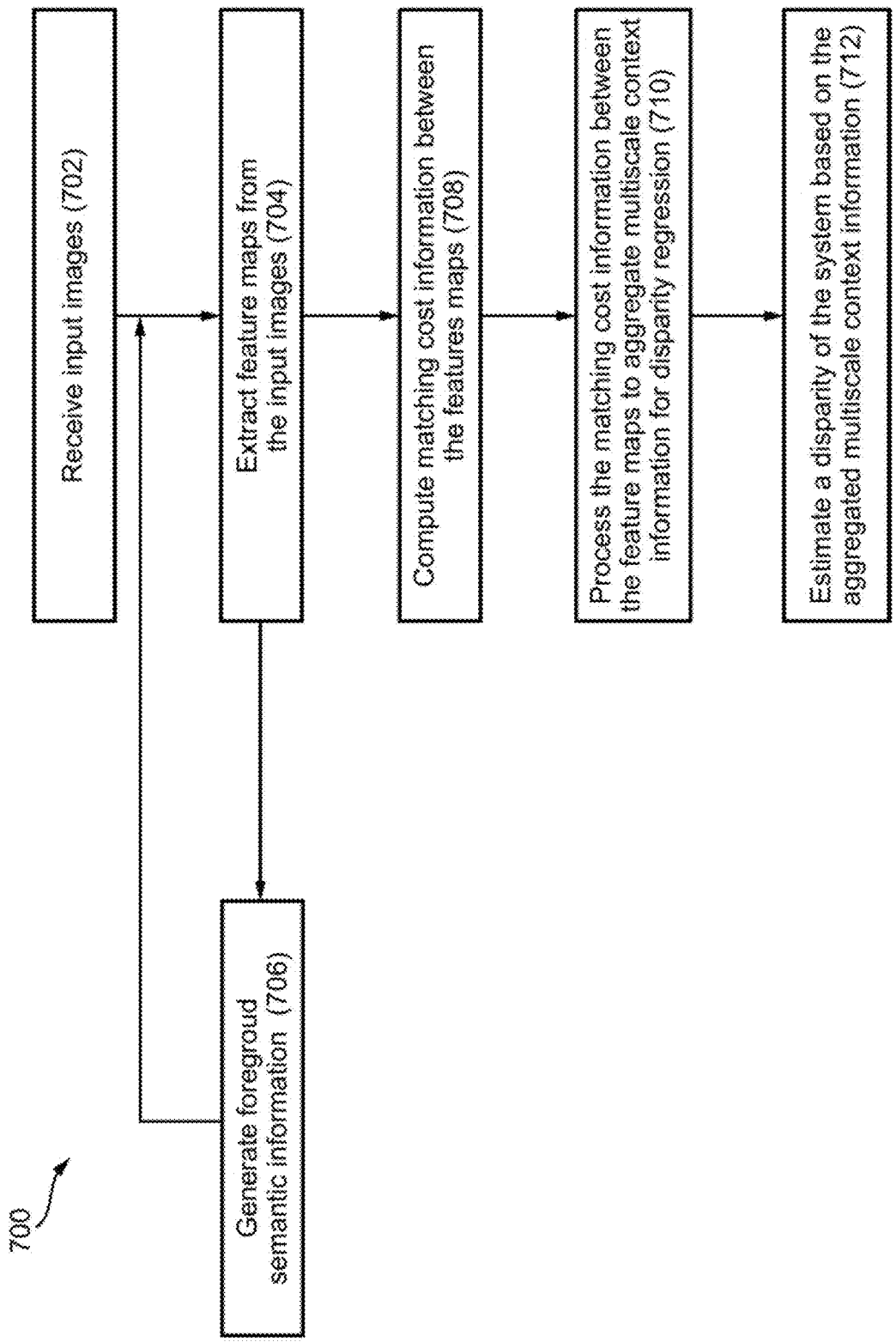
FIG. 7 illustrates a method for disparity estimation of a FBA-AMNet system, according to some embodiments of the present disclosure.

FIG. 7 illustrates a method for disparity estimation of a FBA-AMNet system, according to some embodiments of the present disclosure. The method 700 of FIG. 7 may be implemented in the FBA-AMNet system 600 of FIG. 6.

At 702, input images 602 and 604 are received at D-ResNet 606 and D-ResNet 608.

At 704, feature maps are extracted from the input images (e.g., 602, 604) by the feature extractor modules (e.g., a combination of 606 and 610, and a combination of 608 and 612).

At 706, foreground semantic information (e.g., 632a, 632b) are generated by the semantic information modules (e.g., a combination of 626a, 628a, and 630a, and a combination of 626b, 628b, and 630b) connected at the outputs of the feature extractor modules (e.g., AM module 610, AM module 612). The foreground semantic information (e.g., 632a, 632b) are provided to the one or more feature extractor modules (D-ResNet 606 and D-ResNet 608) for disparity estimation at a next training epoch.

At 708, matching cost information between the one or more feature maps are computed by the ECV module (e.g., 614) connected at the outputs of the feature extractor modules (e.g., AM module 610, AM module 612).

At 710, matching cost information between the one or more feature maps from the ECV module 614 are processed by the stacked AM module 618 connected at an output of the ECV module 614 to aggregate multiscale context information for disparity regression.

At 712, a disparity of the FBA-AMNet system 600 is estimated by a regression module 622 connected at an output of the stacked AM module 618 based on the aggregated multiscale context information and foreground semantic information (e.g., 632a, 632b).

The FBA-AMNet system 600 is recursively trained with the one or more feature maps and the one or more foreground semantic information (e.g., 632a, 632b) until convergence.

The method 700 may be evaluated on three most popular disparity estimation benchmarks: KITTI stereo 2015, KITTI stereo 2012, and Sceneflow.

The KITTI benchmark provides images in size 376×1248 captured by a pair of stereo camera in real-world driving scenes. KITTI stereo 2015 includes 200 training stereo image pairs and 200 test stereo image pairs. Sparse ground-truth disparity maps may be provided with the training data. D1-all error may be used as the main evaluation metric which computes the percentage of pixels for which the estimation error is ≥3 px and ≥5% of its ground-truth disparity.

KITTI stereo 2012 includes 194 training stereo image pairs and 195 test stereo image pairs. Out-Noc error may be used as the main evaluation metric which computes the percentage of pixels for which the estimation error is ≥3 px for all non-occluded pixels.

The Sceneflow benchmark is a synthetic dataset suite that contains above 39000 stereo image pairs in size 540×960 rendered from various synthetic sequence. Three subsets contain around 35000 stereo image pairs may be used for training (Flyingthings3D training, Monkka, and Driving) and one subset contains around 4000 stereo image pairs may be used for testing (Flyingthings3D test). Sceneflow provides complete ground-truth disparity maps for all images. The end-point-error (EPE) may be used as the evaluation metric.

In some embodiments, first, an AMNet-8 and an AMNet-32 are trained from scratch on the Sceneflow training set. For the two models, the dilation factors of the atrous convolutional layers in the AM module are set to [1, 2, 2, 4, 4, 8, 1, 1] and [1, 2, 2, 4, 4, 8, 8, 16, 16, 32, 1, 1], respectively. The maximum disparity D is set to 192. The parameter t in the ECV is set to 0. The weight λ for the segmentation loss is set to 0.5. For a pair of input images, two patches in size 256×512 at a same random location are cropped as inputs to the network. All pixels with a ground-truth disparity larger than D is excluded from training. The model (e.g., 600) is trained end-to-end with a batch size of 16 for 15 epochs with the Adam optimizer. The learning rate is set to $10^{-3}$ initially and is decreased to $10^{-4}$ after 10 epochs. Due to the fact that segmentation labels in Sceneflow are not consistent across scenes or objects, the FBA-AMNet was nor trained on Scene-flow.

In some embodiments, then four models, for example, an AMNet-8, an AMNet-32 (e.g., AMNet 100), a FBA-AMNet-8, and a FBA-AMNet-32 (e.g., FBA-AMNet 600) on KITTI from the pre-trained AMNet-8 and AMNet-32 (e.g., AMNet 100) models, were fine-tuned. To train the FBA-AMNet models, the first layer in the AMNet models may be modified to have 4 channels for the RGB-S input and a binary classification layer, a bilinear up-sampling layer, and a softmax layer for the foreground-background segmentation task may be added. The models are trained using the iterative training method described with respect to FIGS. 6 and 7 with a batch size of 12 for 1000 epochs with the Adam optimizer. The learn-ingrate is set to $10^{-3}$ initially and is decreased to $10^{-4}$ after 600 epochs. The learning rate may be increased to 10 times larger for the new layers. Other settings are the same with the Sceneflow training process. The foreground-background segmentation maps are initialized as zeros at epoch 0.

All the models are implemented with PyTorch on NVIDIA Titan-Xp GPUs.

TABLE 2

Performance comparisons of models of example embodiment with the top published methods on the KITTI stereo 2015 test set. D1-bg refers to evaluating on static background pixels. D1-fg refers to evaluating on dynamic foreground pixels. D1-all refers to evaluating on all pixels.

| Method | All pixels | | | Non-Occluded pixels | | | Run-time |
|---|---|---|---|---|---|---|---|
| | D1-bg | D1-fg | D1-all | D1-bg | D1-fg | D1-all | |
| GC-Net | 2.21% | 6.16% | 2.87% | 2.02% | 5.58% | 2.61% | 0.9 s |
| Edge-Stereo | 2.27% | 4.18% | 2.59% | 2.12% | 3.85% | 2.40% | 0.27 s |
| PDSNet | 2.29% | 4.05% | 2.58% | 2.09% | 3.68% | 2.36% | 0.5 s |
| PSMNet | 1.86% | 4.62% | 2.32% | 1.71% | 4.31% | 2.14% | 0.41 s |
| Seg-Stereo | 1.88% | 4.07% | 2.25% | 1.76% | 3.70% | 2.08% | 0.6 s |
| AMNet-8 | 1.64% | 3.96% | 2.03% | 1.50% | 3.75% | 1.87% | 0.7 s |
| AMNet-32 | 1.60% | 3.81% | 1.97% | 1.47% | 3.46% | 1.80% | 0.9 s |
| FBA-AMNet-8 | 1.60% | 3.88% | 1.98% | 1.45% | 3.74% | 1.82% | 0.7 s |
| FBA-AMNet-32 | 1.55% | 3.82% | 1.93% | 1.40% | 3.59% | 1.77% | 0.9 s |

TABLE 3

Performance comparisons on the KITTI stereo 2012 test set.

| Method | Out-Noc | Out-Occ | Ave-Noc | Ave-Occ |
|---|---|---|---|---|
| PDSNet | 1.92% | 2.53% | 0.9 px | 1.0 px |
| GC-Net | 1.77% | 2.30% | 0.6 px | 0.7 px |
| EdgeStereo | 1.73% | 2.18% | 0.5 px | 0.6 px |
| SegStereo | 1.68% | 2.03% | 0.5 px | 0.6 px |
| PSMNet | 1.49% | 1.89% | 0.5 px | 0.6 px |
| AMNet-8 | 1.38% | 1.79% | 0.5 px | 0.5 px |
| AMNet-32 | 1.33% | 1.74% | 0.5 px | 0.5 px |
| FBA-AMNet-8 | 1.36% | 1.76% | 0.5 px | 0.5 px |
| FBA-AMNet-32 | 1.32% | 1.73% | 0.5 px | 0.5 px |

The error threshold is set to 3.

TABLE 4

Performance comparisons on the Sceneflow test set.

| Method | GC-Net | DispNetC | PSMNet | AMNet- | AMNet- |
|---|---|---|---|---|---|
| EPE | 2.51 | 1.68 | 1.09 | 0.81 | 0.74 |

All results are reported in EPE.

Results on the KITTI stereo 2015 test set: four models, AMNet-8, AMNet-32 (e.g., AMNet 100), FBA-AMNet-8, and FBA-AMNet-32 (e.g., FBA-AMNet 600), are compared on the KITTI stereo 2015 test set with all published methods on all evaluation settings. The results are shown in table 2. All the four models outperform previous methods on D1-all with significant margins. The FBA-AMNet-32 (e.g., FBA-AMNet 600) model pushes the D1-all (all pixels) to 1.93%, with a relative gain of 14.2% compared to the previous best result at 2.25%.

Results on the KITTI stereo 2012 test set: performance comparisons on the KITTI stereo 2012 test set are shown in table 3. Being consistent with KITTI stereo 2015, the four models significantly outperform all other published methods on all evaluation settings. The FBA-AMNet-32 (e.g., FBA-AMNet 600) model decreases the Out-Noc to 1.32%, with a relative gain of 11.4% compared to the previous best result reported at 1.49%. Only results for error threshold 3 are reported here. The results for other error thresholds are consistent with 3.

Results on Sceneflow test set: the AMNet-8 model and the AMNet-32 (e.g., AMNet 100) model are compared with all published methods on the Sceneflow test set. Both of the models outperform other methods with large margins. Results reported in EPE are shown in table 4. The AMNet-32 (e.g., AMNet 100) model pushes EPE to 0.74, with a relative gain of 32.1% compare to previous best result at 1.09.

The following sections analyze the effectiveness of each component of the present architecture in details. Most of the analysis is conducted on the Sceneflow test set, because KITTI only allows a limited number of evaluations per month on the test set.

This section explores how the modifications to the network back-bone from a standard ResNet-50 to a D-ResNet change performance and complexity. Three models, a AMNet-32 (e.g., AMNet 100) model using ResNet-50 as the network backbone, a AMNet-32 (e.g., AMNet 100) model using modified ResNet-50 as the network backbone, by directly replacing standard convolution to depthwise separable convolution, and the example AMNet-32 (e.g., AMNet 100) model are compared. The results on the Sceneflow test set and number of parameters in each model are shown in table 5. The D-ResNet outperforms the standard ResNet-50 as network backbone with less number of parameters.

TABLE 5

Performance and complexity comparisons of three models using different network backbones.

| Backbone | EPE | # parameters |
|---|---|---|
| ResNet-50 | 0.79 | 4.81 million |
| ResNet-50 (sep conv) | 0.81 | 1.72 million |
| D-ResNet | 0.74 | 4.37 million |

Results are reported on the Sceneflow test set.

A ablation study for the ECV with seven models modified from the AMNet-32 (e.g., AMNet 100) model by using different combinations of the three sub-volumes (e.g., disparity-level feature distance sub-volume, disparity-level depthwise correlation sub-volume, and disparity-level feature concatenation sub-volume) are performed. The result comparisons on the Sceneflow test set and the feature size comparisons are shown in table 6. The results show that the disparity-level feature distance sub-volume is more effective than the other two, and a combination of the three sub-volumes (e.g., ECV module 614) leads to the best performance.

TABLE 6

Performance and feature size comparisons of models using different cost volumes.

| Cost volume | EPE | Feature size |
|---|---|---|
| Dist. | 0.82 | H × W × (D + 1) × C |
| Corr. | 0.85 | H × W × (D + 1) × C |
| FC | 0.84 | H × W × (D + 1) × 2C |
| Dist. + Corr. | 0.78 | H × W × (D + 1) × 2C |
| Dist. + FC | 0.76 | H × W × (D + 1) × 3C |
| Corr. + FC | 0.8 | H × W × (D + 1) × 3C |
| ECV | 0.74 | H × W × (D + 1) × 4C |

'Dist.', 'Corr.', and 'FC' refer to the disparity-level feature distance, the disparity-level depthwise correlation, and the disparity-level feature concatenation, respectively. All results are reported on the Sceneflow test set in EPE.

TABLE 7

Performance and run time per image comparisons.

| k | EPE | Runtime |
|---|---|---|
| 4 | 0.86 | 0.6 s |
| 8 | 0.81 | 0.8 s |
| 16 | 0.77 | 0.9 s |
| 32 | 0.74 | 1.1 s |

All results are reported on the Sceneflow test set. Test images are in size 540 × 960.

In some embodiments, a deeper structure allows the AM module (e.g., 610, 612) to aggregate more multiscale contextual information that leads to a finer feature representation, while being more computationally expensive. The effect of different structures of the AM module on the performance and speed of the AMNet-32 (e.g., AMNet 100) model may be analyzed by setting its maximum dilation factor k to 4, 8, 16, and 32. Performance and speed comparisons of the four models on the Sceneflow test set are shown in table 7. All test images are in size 540×960.

Figure 8:
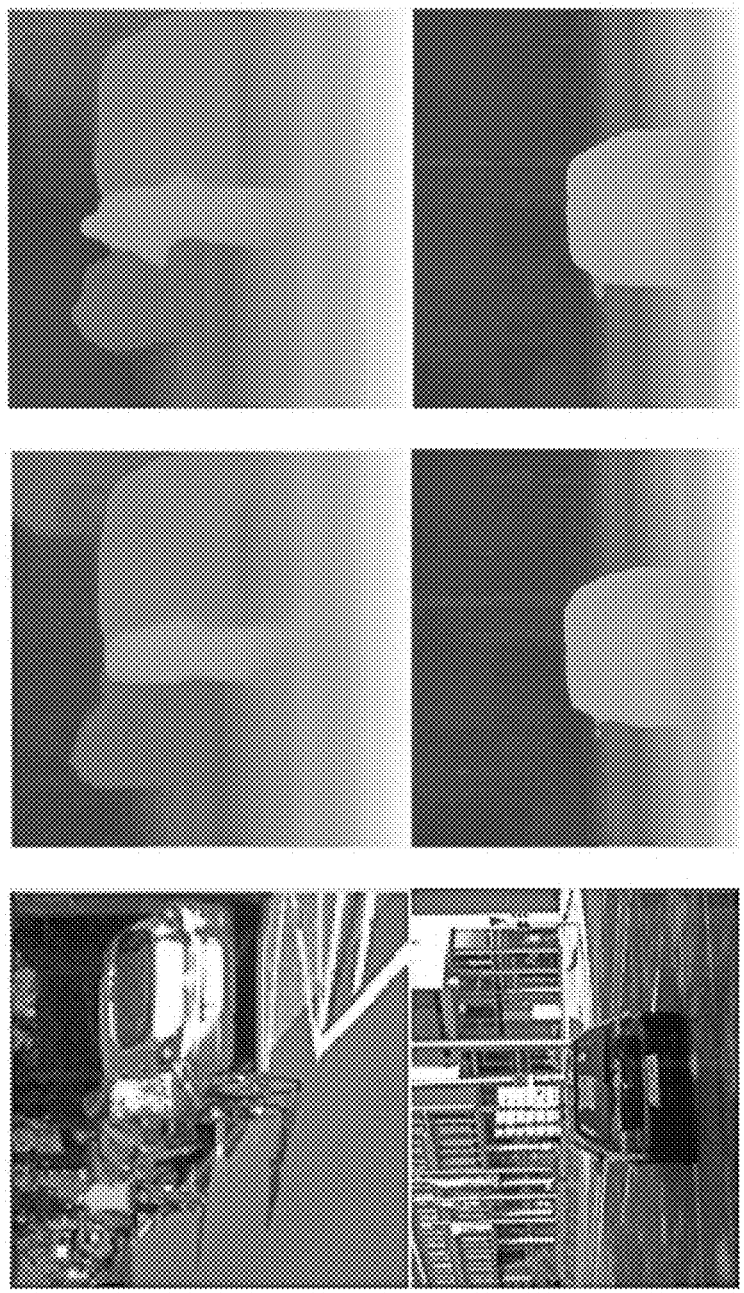
FIG. 8 illustrates the disparity estimation results of the AMNet and the FBA-AMNet on two foreground objects, according to some embodiments of the present disclosure.

Compare to the AMNet, the FBA-AMNet (e.g., 600) is designed and trained to generate smoother and more accurate shapes for foreground objects, which leads to finer disparity maps. FIG. 8 illustrates the disparity estimation results of the AMNet model (e.g., 100) and the FBA-AMNet (600) model on two challenging foreground objects from KITTI test images. The visualizations in FIG. 8 support the fact that the FBA-AMNet (e.g., 600) is able to generate finer details for the foreground objects.

Figure 9:
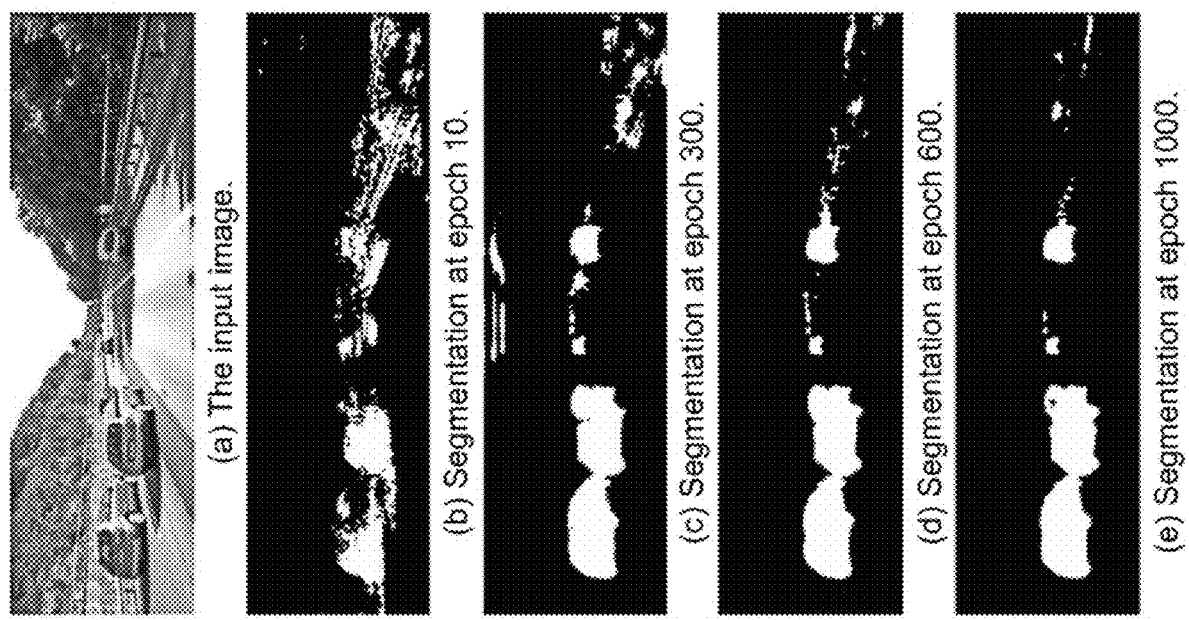
FIG. 9 illustrates one image and the coarse-to-fine foreground-background segmentation results generated by FBA-AMNet, according to some embodiments of the present disclosure.

FIG. 9 illustrates one image from the KITTI stereo 2015 test set and the coarse-to-fine foreground-background segmentation results generated by FBA-AMNet-32 (e.g., FBA-AMNet 600) models at training epoch 10, 300, 600, and 1000. The visualizations show that during the training process, the multi-task network gradually learns better awareness of foreground objects. Because the optimization procedure of the multi-task network is biased towards the disparity estimation task, the segmentation task to generate a decent segmentation map is expected.

Example embodiments of the present disclosure provide an end-to-end deep learning architecture with designs for each major component for disparity estimation. The model (e.g., 600) is able to extract deep and discriminant features, compute rich matching costs using three different similarity measurements, and aggregate multiscale contextual information for dense disparity estimation. How each component contributes to the final result are analyzed and visualize in details. The example FBA-AMNet (e.g., 600) outperformed all other published methods on three most popular disparity estimation benchmarks.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

In some embodiments, one or more outputs of the different embodiments of the methods and systems of the present disclosure may be transmitted to an electronics device coupled to or having a display device for displaying the one or more outputs or information regarding the one or more outputs of the different embodiments of the methods and systems of the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although exemplary embodiments of a foreground-background-aware atrous multiscale network for disparity estimation have been specifically described and illustrated herein, many modifications and variations will be apparent to those skilled in the art. Accordingly, it is to be understood that to a foreground-background-aware atrous multiscale network for disparity estimation constructed according to principles of this disclosure may be embodied other than as specifically described herein. The inventive concept is also defined in the following claims, and equivalents thereof.

What is claimed is:

1. A system for disparity estimation, the system comprising:
   one or more feature extractor modules configured to extract one or more feature maps from one or more input images; and
   one or more semantic information modules connected at one or more outputs of the one or more feature extractor modules,
   wherein the one or more semantic information modules are configured to generate one or more foreground semantic information to be provided to the one or more feature extractor modules for disparity estimation at a next training epoch.

2. The system of claim 1, wherein the one or more input images comprise a first input image and a second input image, and wherein the one or more feature maps extracted from the one or more input images comprise a first feature map extracted from the first input image and a second feature map extracted from the second input image.

3. The system of claim 1, wherein the system is a multitask module configured to perform two tasks, wherein the two tasks are disparity estimation and foreground semantic information generation, wherein a loss of the system is a weighted sum of two losses from the two tasks.

4. The system of claim 2, further comprising:
   an extended cost volume (ECV) module connected at the one or more outputs of the one or more feature extractor modules, the ECV module configured to compute matching cost information between the one or more features maps;
   a stacked atrous multiscale (AM) module connected at an output of the ECV module and configured to process the matching cost information between the one or more feature maps from the ECV module to aggregate multiscale context information, the stacked AM module comprising a plurality of AM modules stacked together; and
   a regression module connected at an output of the stacked AM module and configured to estimate a disparity of the system based on the aggregated multiscale context information from the stacked AM module and one or more foreground semantic information.

5. The system of claim 4, wherein the ECV module comprises:

a disparity-level feature distance sub-volume module configured to determine a pixel wise absolute difference between the first feature map and the second feature map;

a disparity level depthwise correlation sub-volume module configured to determine a correlation between the first feature map and the second feature map; and a disparity-level feature concatenation sub-volume module configured to concatenate, at each disparity-level d, d-shifted first feature map with the second feature map.

6. The system of claim 4, wherein the stacked AM module comprises a plurality of AM modules stacked together with shortcut connections within the stacked AM module, wherein an AM module of the plurality of AM modules of the stacked AM module is configured to process the matching cost information between the one or more feature maps from the ECV with k pairs of 3×3 atrous convolution layers and two 1×1 convolution layers.

7. The system of claim 4, wherein the one or more feature extractor modules comprise:
a first depthwise separable residual network (D-ResNet) module configured to receive the first input image and first foreground semantic information;
a second D-ResNet module configured to receive the second input image and second foreground semantic information;
a first AM module connected at an output of the first D-ResNet module; and
a second AM module connected at an output of the second D-ResNet module.

8. The system of claim 5, wherein:
a size of the disparity-level feature distance sub-volume module is H×W×(D+1)×C, wherein H, W, and C represent height, width, and feature size, and D represents a maximum disparity the system is capable of predicting;
a size of the disparity level depthwise correlation sub-volume module is H×W×+1)×C; and
a size of the disparity-level feature concatenation sub-volume module is H×W×+1)×2C.

9. The system of claim 6, wherein the k pairs of 3×3 atrous convolution layers have dilation factors of $$\left[1, 2, 2, 4, 4, \ldots, \frac{k}{2}, \frac{k}{2}, k\right],$$

wherein the two 1×1 convolution layers with dilation factor one are added at an end of the AM module of the plurality of AM modules for feature refinement and feature size adjusting.

10. The system of claim 7, wherein the first D-ResNet module and the second D-ResNet module have shared weights and the first AM module and the second AM module have shared weights, wherein each of the first AM module and the second AM module is configured as a scene understanding module to capture deep global contextual information and local details, and wherein the ECV module is connected at an output of the first AM module and an output of the second AM module.

11. The system of claim 7, wherein the one or more semantic information modules comprise:
a first semantic information module connected at an output of the first AM module, wherein the first semantic information module is configured to generate the first foreground semantic information, wherein the first foreground semantic information are provided to the first D-ResNet module as an additional input to the system for the next training epoch of the system via a first feedback loop; and
a second semantic information module connected at an output of the second AM module, wherein the second semantic information module is configured to generate the second foreground semantic information, wherein the second foreground semantic information are provided to the second D-ResNet module as an additional input to the for the system for the next training epoch of the system via a second feedback loop.

12. The system of claim 8, wherein the system is further configured to determine a size of the ECV module by concatenating disparity-level features of the distance sub-volume module, the disparity level depthwise correlation sub-volume module, and the disparity-level feature concatenation sub-volume module along a depth dimension, wherein the size of the ECV module is H×W×(D+1)×4C.

13. The system of claim 11, wherein the first semantic information module comprises:
a first convolutional neural network (CNN) module connected at the output of the first AM module;
a first up-sampling module connected at an output of the first CNN module; and
a first prediction module connected at the output of the first up-sampling module and configured to generate the first foreground semantic information.

14. The system of claim 11, wherein the second semantic information module comprises:
a second convolutional neural network (CNN) module connected at the output of the second AM module;
a second up-sampling module connected at an output of the second CNN module; and
a second prediction module connected at the output of the second up-sampling module and configured to generate the second foreground semantic information.

15. A method for disparity estimation of a system comprising one or more feature extractor modules, one or more semantic information modules, an extended cost volume (ECV) module, a stacked atrous multiscale (AM) module, and a regression module, the method comprising:
extracting, by the one or more feature extractor modules, one or more feature maps from one or more input images;
generating one or more foreground semantic information by the one or more semantic information modules connected at one or more outputs of the one or more feature extractor modules, wherein the one or more foreground semantic information are provided to the one or more feature extractor modules;
computing matching cost information between the one or more feature maps by the ECV module connected at the one or more outputs of the one or more feature extractor modules;
processing the matching cost information between the one or more feature maps from the ECV module, by the stacked AM module connected at an output of the ECV module, to aggregate multiscale context information for disparity regression;
estimating, by the regression module connected at an output of the stacked AM module, a disparity of the system based on the aggregated multiscale context information and foreground semantic information; and
recursively training the system with the one or more feature maps and the one or more foreground semantic information until convergence.

16. The method of claim 15, wherein the one or more foreground semantic information of a current epoch is computed by the one or more semantic information modules in a previous epoch, wherein the one or more input images comprise a first input image and a second input image, wherein the one or more feature maps extracted from the one or more input images comprise a first feature map extracted from the first input image and a second feature map extracted from the second input image, and wherein the method further comprises:
- determining, by a disparity-level feature distance sub-volume module of the ECV module, a pixel wise absolute difference between the first feature map and the second feature map;
- determining, by a disparity level depthwise correlation sub-volume module of the ECV module, a correlation between the first feature map and the second feature map; and
- concatenating at each disparity-level d, by a disparity-level feature concatenation sub-volume module, d-shifted first feature map with the second feature map.

17. The method of claim 16, wherein:
- a size of the disparity-level feature distance sub-volume module is H×W×(D+1)×C, wherein H, W, and C represent height, width, and feature size, and D represents a maximum disparity the system is capable of predicting;
- a size of the disparity level depthwise correlation sub-volume module is H×W×+1)×C; and
- a size of the disparity-level feature concatenation sub-volume module is H×W×+1)×2C.

18. The method of claim 16, wherein the stacked AM module comprises a plurality of AM modules stacked together with shortcut connections within the stacked AM module, wherein the method further comprises processing, by an AM module of the plurality of AM modules of the stacked AM module, the matching cost information between the one or more feature maps from the ECV with k pairs of 3×3 atrous convolution layers and two 1×1 convolution layers, wherein the k pairs of 3×3 atrous convolution layers have dilation factors of $$\left[1, 2, 2, 4, 4, \ldots, \frac{k}{2}, \frac{k}{2}, k\right],$$

wherein the two 1×1 convolution layers with dilation factor one are added at an end of the AM module for feature refinement and feature size adjusting.

19. The method of claim 17, further comprising:
- determining a size of the ECV module by concatenating disparity-level features of the distance sub-volume module, the disparity level depthwise correlation sub-volume module, and the disparity-level feature concatenation sub-volume module along a depth dimension, wherein the size of the ECV module is H×W×(D+1)×4C.

20. The method of claim 17, further comprising:
- generating, by a first semantic information module of the one or more semantic information modules, first foreground semantic information;
- receiving, by a first depthwise separable residual network (D-ResNet) module of the one or more feature extractor modules, the first input image and the first foreground semantic information, wherein the first foreground semantic information are provided to the first D-ResNet module as an additional input for a next training epoch of the system via a first feedback loop;
- generating, by a second semantic information module of the one or more semantic information modules, a second foreground semantic information;
- receiving, by a second D-ResNet module of the one or more feature extractor modules, the second input image and the second foreground semantic information, wherein the second foreground semantic information are provided to the second D-ResNet module as an additional input for the next training epoch of the system via a second feedback loop; and
- capturing deep global contextual information and local details by a first AM module and a second AM module of the one or more feature extractor modules, for scene understanding.

* * * * *